(12) United States Patent
Jo et al.

(10) Patent No.: US 11,059,954 B2
(45) Date of Patent: Jul. 13, 2021

(54) COMPOSITION FOR PREPARING TRANSPARENT POLYMER FILM, TRANSPARENT POLYMER FILM, AND ELECTRONIC DEVICE INCLUDING SAME

(71) Applicants: SAMSUNG ELECTRONICS CO., LTD., Suwon-si (KR); Samsung SDI Co., Ltd., Yongin-si (KR)

(72) Inventors: A Ra Jo, Euiwang-si (KR); Chanjae Ahn, Suwon-si (KR); Byunghee Sohn, Yongin-si (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 467 days.

(21) Appl. No.: 15/397,180

(22) Filed: Jan. 3, 2017

(65) Prior Publication Data
US 2017/0190880 A1 Jul. 6, 2017

(30) Foreign Application Priority Data

Dec. 31, 2015 (KR) ........................ 10-2015-0191449
Dec. 22, 2016 (EP) .................................. 16206523

(51) Int. Cl.
| | |
|---|---|
| C08K 5/56 | (2006.01) |
| C08G 73/14 | (2006.01) |
| C08K 5/00 | (2006.01) |
| C08G 73/10 | (2006.01) |
| C09B 69/10 | (2006.01) |
| C08K 5/357 | (2006.01) |
| C08G 69/32 | (2006.01) |

(52) U.S. Cl.
CPC ............ *C08K 5/56* (2013.01); *C08G 73/1003* (2013.01); *C08G 73/1039* (2013.01); *C08G 73/1042* (2013.01); *C08G 73/14* (2013.01); *C08K 5/0091* (2013.01); *C08K 5/357* (2013.01); *C09B 69/10* (2013.01); *C09B 69/101* (2013.01); *C09B 69/103* (2013.01); *C08G 69/32* (2013.01)

(58) Field of Classification Search
CPC ............ C08G 73/1003; C08G 73/1039; C08G 73/1042; C08G 73/14; C08G 69/32; C08K 5/0091; C08K 5/357; C08K 5/56; C09B 69/10; C09B 69/101; C09B 69/103
See application file for complete search history.

(56) References Cited

U.S. PATENT DOCUMENTS

| | | | |
|---|---|---|---|
| 9,018,343 B2 | 4/2015 | Park et al. | |
| 9,200,117 B2 | 12/2015 | Cho et al. | |
| 9,796,816 B2 | 10/2017 | Cho et al. | |
| 10,093,789 B2 | 10/2018 | Sato et al. | |
| 2004/0166342 A1 | 8/2004 | Wursche et al. | |
| 2012/0065327 A1 | 3/2012 | Ogawa et al. | |
| 2014/0111962 A1* | 4/2014 | Park ........................ | G06F 3/041 361/818 |
| 2014/0338959 A1* | 11/2014 | Jung ...................... | C08J 7/0423 174/253 |
| 2015/0057426 A1* | 2/2015 | Cho ................... | C08G 73/1064 528/340 |
| 2015/0166726 A1 | 6/2015 | Ogawa et al. | |

FOREIGN PATENT DOCUMENTS

| | | | | |
|---|---|---|---|---|
| EP | 3008133 A2 * | 4/2016 | .......... | C09D 11/037 |
| JP | 2003-073472 A | 3/2003 | | |

(Continued)

OTHER PUBLICATIONS

JP-2003073472-A Machine Translation (Year: 2003).*

(Continued)

*Primary Examiner* — Travis M Figg
(74) *Attorney, Agent, or Firm* — Cantor Colburn LLP

(57) ABSTRACT

A composition for preparing an article including a polyimide or poly(imide-amide) copolymer, the composition including (1) at least one of (i) a polyimide, a polyamic acid, or a poly(imide-amic acid) including at least one selected from a structural unit represented by Chemical Formula 1 and a structural unit represented by Chemical Formula 2; and (ii) a poly(imide-amide) copolymer, a poly(amic acid-amide) copolymer, or a poly(imide and amic acid-amide) copolymer including at least one selected from a structural unit represented by Chemical Formula 1 and a structural unit represented by Chemical Formula 2, and a structural unit represented by Chemical Formula 3, and (2) a compound having a maximum absorption wavelength at about 570 nm or more in a visible radiation region:

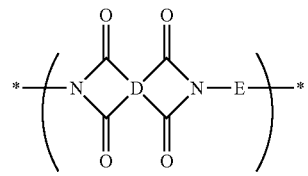

Chemical Formula 1

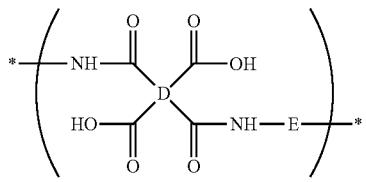

Chemical Formula 2

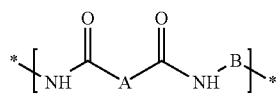

Chemical Formula 3 wherein in Chemical Formulae 1 to 3, A, B, D, and E are the same as defined in the detailed description.

20 Claims, No Drawings

(56) References Cited

FOREIGN PATENT DOCUMENTS

| | | | |
|---|---|---|---|
| JP | 2003073472 A | * | 3/2003 |
| JP | 2009191244 A | | 8/2009 |
| JP | 2012241196 A | | 12/2012 |
| JP | 2013064975 A | | 4/2013 |
| KR | 2012-0033867 A | | 4/2012 |
| KR | 2013-0035691 A | | 4/2013 |
| KR | 2013-0074167 A | | 7/2013 |
| WO | 2010-137703 A1 | | 12/2010 |
| WO | 2015020020 A1 | | 2/2015 |

OTHER PUBLICATIONS

E. Spassova et al. "Vacuum deposited composite polyimide-phthalocyanine films", Vacuum 58 (2000) 440-446.
Extended European Search Report dated May 16, 2017, of the corresponding European Patent Application No. 16206523.9.
Germa de la Torre et al. "The Phthalocyanine Approach to Second Harmonic Generation", Adv. Matter. 1997, 9, No. 3.
English Translation of Office Action dated Oct. 20, 2020, of the corresponding Japanese Patent Application No. 2016-254185.
Office Action dated Oct. 20, 2020, of the corresponding Japanese Patent Application No. 2016-254185.

* cited by examiner

COMPOSITION FOR PREPARING TRANSPARENT POLYMER FILM, TRANSPARENT POLYMER FILM, AND ELECTRONIC DEVICE INCLUDING SAME

CROSS-REFERENCE TO RELATED APPLICATIONS

This application claims priority to Korean Patent Application No. 10-2015-0191449 filed in the Korean Intellectual Property Office on Dec. 31, 2015, and European Patent Application No. 16206523.9 filed in the European Patent Office on Dec. 22, 2016, and all the benefits accruing therefrom under 35 U.S.C. § 119, the contents of which are incorporated herein in their entirety by reference.

BACKGROUND

1. Field

A composition for preparing an article including polyimide or poly(imide-amide) copolymer, an article including polyimide or poly(imide-amide) copolymer, and an electronic device including the article are disclosed.

2. Description of the Related Art

Portable display devices such as a smart phone or a tablet personal computer (PC) have been objects of active research because of their high performance and popularity. For example, research and development efforts to commercialize a light-weight flexible (i.e., bendable or foldable) portable display device have been undertaken. The portable display device of a liquid crystal display or the like includes a protective window for protecting a display module such as a liquid crystal layer. Currently, most portable display devices include a window including a rigid glass substrate. However, glass is a fragile material, which gets easily broken by an exterior impact when used in a portable display device or the like. Also, glass is a non-flexible material, so it may not be suitable for a flexible display device. Therefore, extensive efforts have been undertaken to substitute a protective window with a plastic film in a display device. However, it is very difficult for a plastic film to simultaneously satisfy optimal mechanical properties, such as hardness, and optimal optical properties, which are required for the protective window in a display device. Accordingly, the development of the plastic film material as a protective window for a display device has been delayed.

SUMMARY

An embodiment provides a composition for preparing an article including a polyimide or poly(imide-amide) copolymer.

Another embodiment provides an article having high mechanical characteristics and optical properties prepared by using the composition of an embodiment.

Yet another embodiment provides a display device including the article.

An embodiment provides a composition for preparing an article including a polyimide or poly(imide-amide) copolymer, the composition including:

(1) at least one of (i) a polyimide, a polyamic acid, or a poly(imide-amic acid) including at least one selected from a structural unit represented by Chemical Formula 1 and a structural unit represented by Chemical Formula 2; and (ii) a poly(imide-amide) copolymer, a poly(amic acid-amide) copolymer, or a poly(imide and amic acid-amide) copolymer including at least one selected from a structural unit represented by Chemical Formula 1 and a structural unit represented by Chemical Formula 2, and a structural unit represented by Chemical Formula 3, and (2) a compound having a maximum absorption wavelength at about 570 nanometers or more in a visible radiation region:

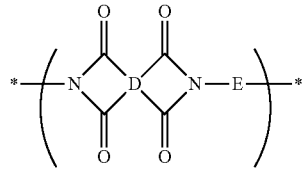

Chemical Formula 1

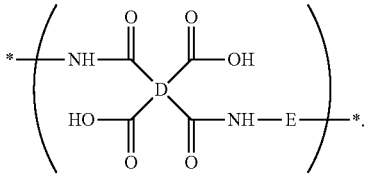

Chemical Formula 2

In Chemical Formulae 1 and 2,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to 010 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and E is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"—(wherein, R' and R" are independently hydrogen, C1 to C10 aliphatic hydrocarbon group, C6 to C20 aromatic hydrocarbon group, or C6 to C20 alicyclic hydrocarbon group), —C(CF$_3$)$_2$—, —C(CF$_3$)(C$_6$H$_5$)—, or —C(=O)NH—.

Chemical Formula 3

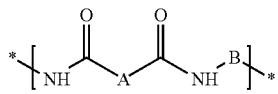

In Chemical Formula 3,

A and B are independently a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —O(═O)—, —CH(OH)—, —S(═O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(═O)NH—.

The compound having a maximum absorption wavelength at about 570 nanometers or more in a visible radiation region may be included in an amount of about 1 part per million or greater based on a total weight of (i) the polyimide, the polyamic acid, or the poly(imide-amic acid), and/or (ii) the poly(imide-amide) copolymer, the poly(amic acid-amide) copolymer, or the poly(imide and amic acid-amide) copolymer.

The compound having a maximum absorption wavelength at about 570 nm or more in a visible radiation region may include at least one blue pigment selected from a metal phthalocyanine-based pigment, an indanthrone-based pigment, and an indophenol-based pigment, or at least one violet pigment selected from dioxazine violet, first violet B, methyl violet, and indanthrene brilliant violet.

The compound having a maximum absorption wavelength at about 570 nm or more in a visible radiation region may be included in an amount of about 1 part per million to about 100 parts per million based on the weight of (i) the polyimide, the polyamic acid, or the poly(imide-amic acid), and/or (ii) the poly(imide-amide) copolymer, the poly(amic acid-amide) copolymer, or the poly(imide and amic acid-amide) copolymer in the composition according to an embodiment.

D in Chemical Formula 1 and Chemical Formula 2 may independently be selected from chemical formulae of Group 1:

Group 1

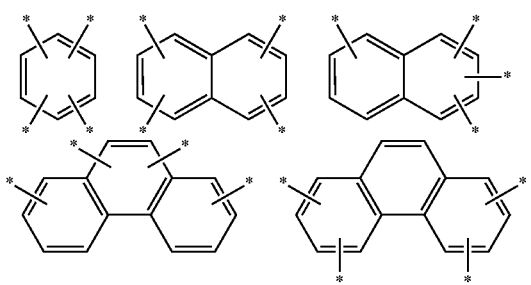

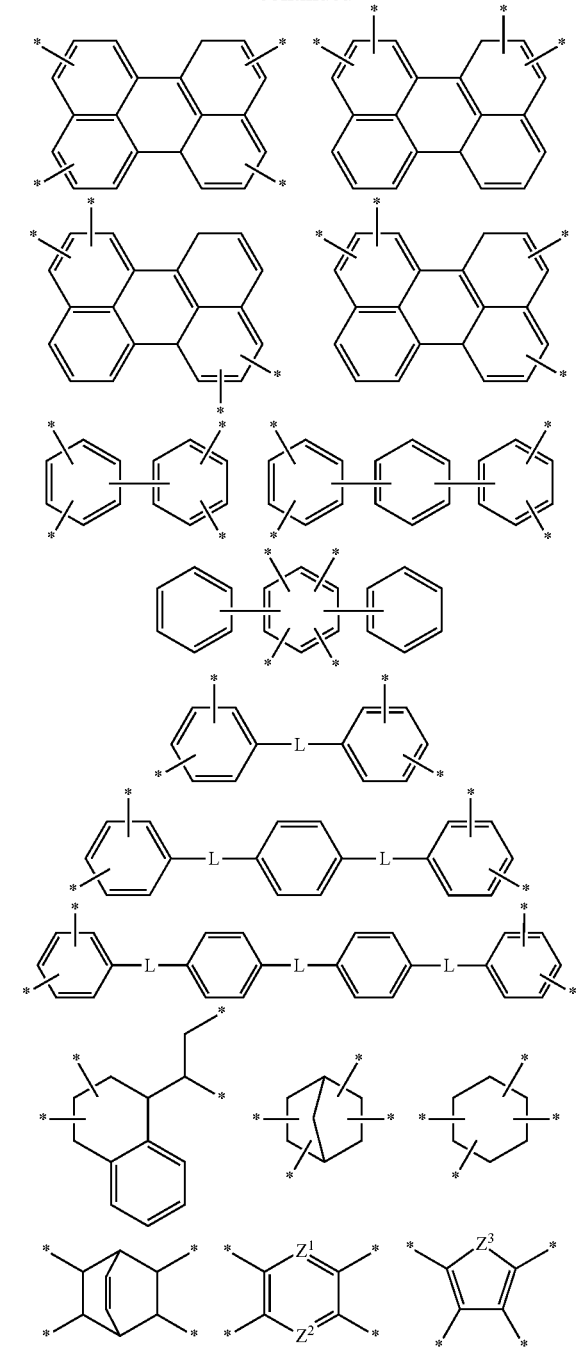

wherein, in the chemical formulae of Group 1, each residual group may be substituted or unsubstituted, and each L may be the same or different and may be independently a single bond, —O—, —S—, —C(═O)—, —CH(OH)—, —S(═O)$_2$—, —Si(CH$_3$)$_2$—, —(CH$_2$)$_p$— (wherein, 1≤q≤10), (CF$_2$)$_q$ (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(═O)NH—,

* is a linking point to an adjacent atom, $Z^1$ and $Z^2$ are the same or different and are independently —N═ or —C(R$^{100}$)═, wherein R$^{100}$ is hydrogen or a C1 to C5 alkyl group, provided that $Z^1$ and $Z^2$ are not simultaneously —C(R$^{100}$)═, and $Z^3$ is —O—, —S—, or —NR$^{101}$—, wherein R$^{101}$ is hydrogen or a C1 to C5 alkyl group.
D in Chemical Formula 1 and Chemical Formula 2 may independently be selected from chemical formulae of Group 2:
Group 2
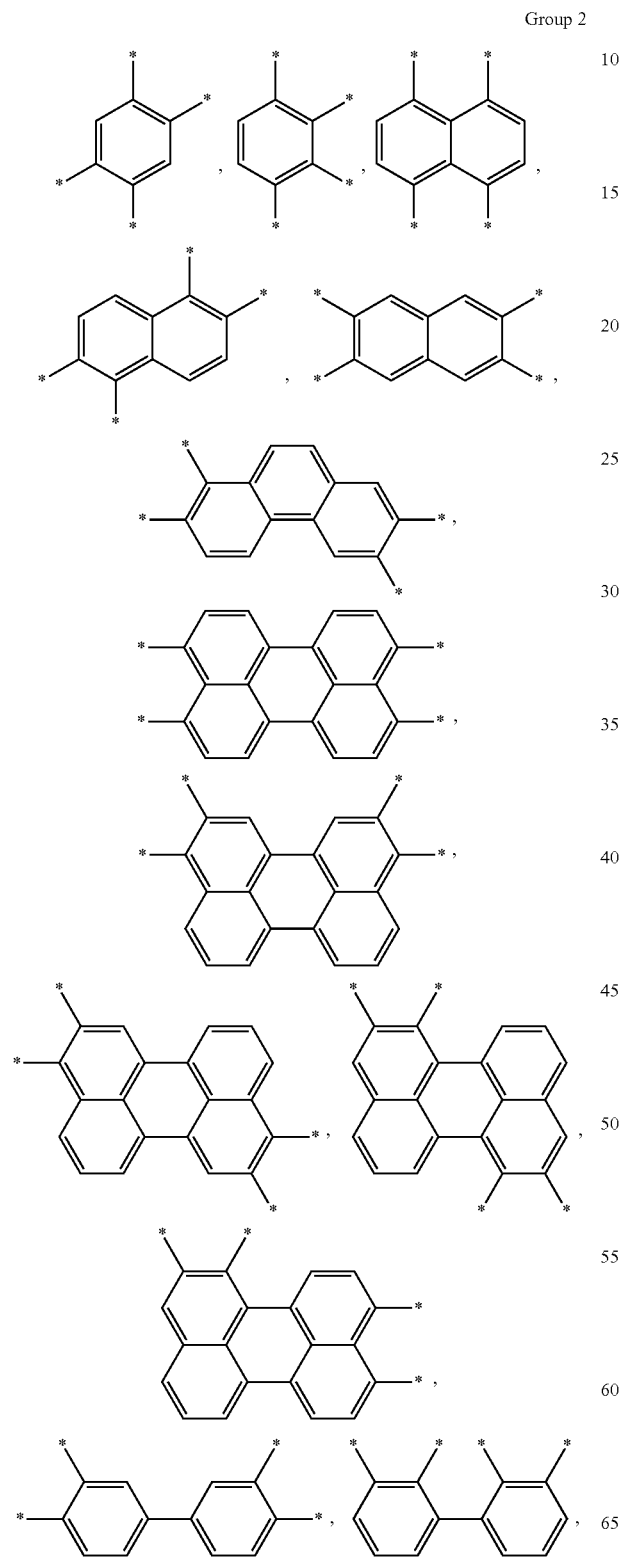
-continued
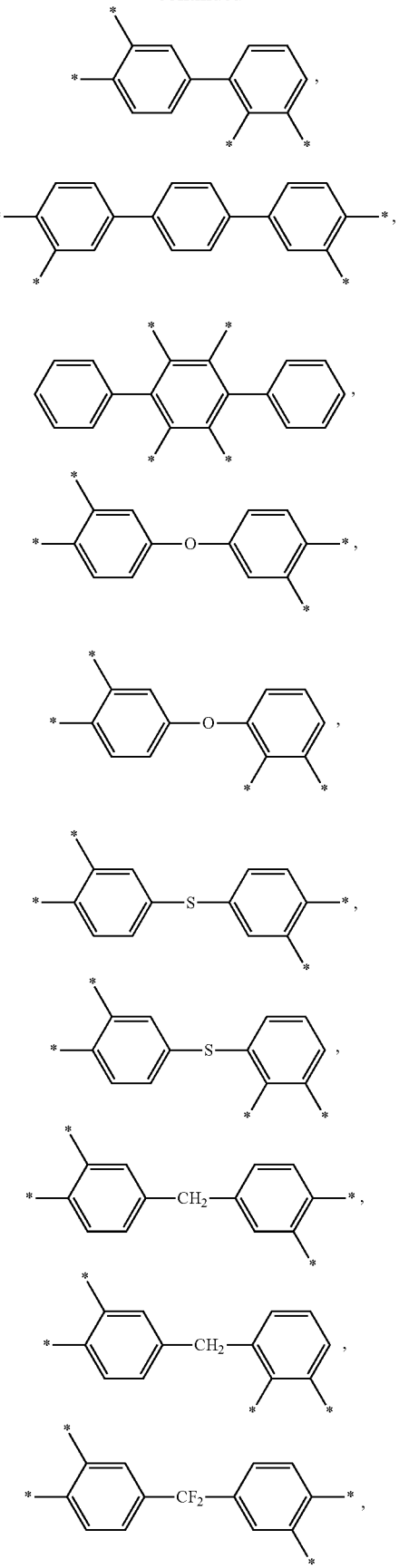

-continued
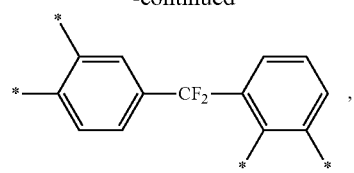
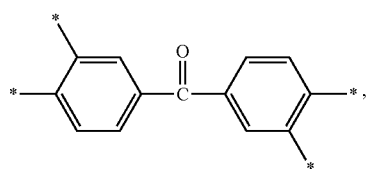
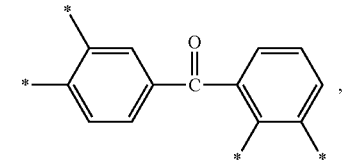
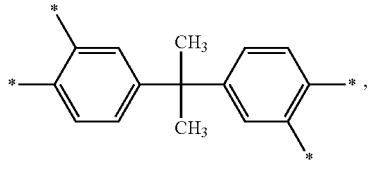
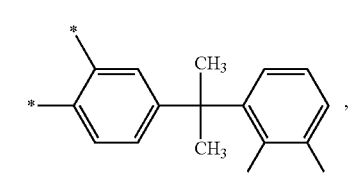
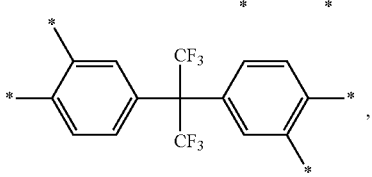
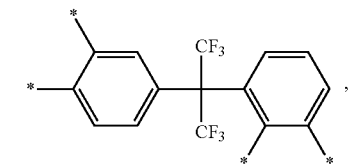
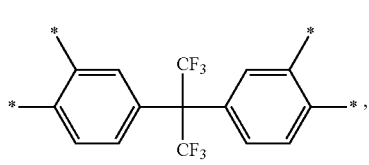
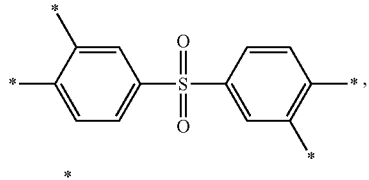
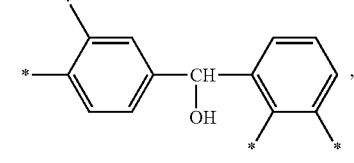
-continued
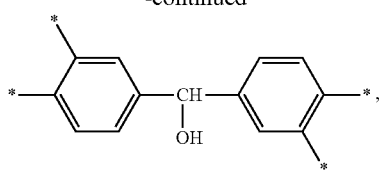
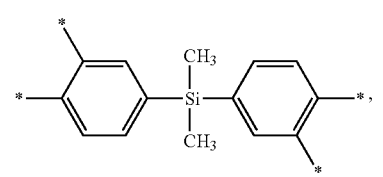
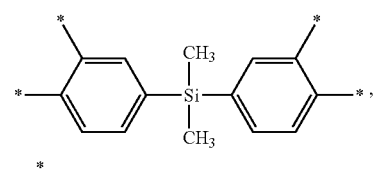
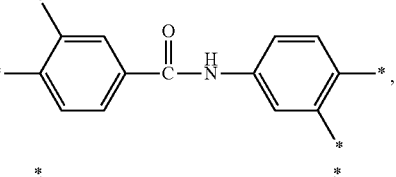
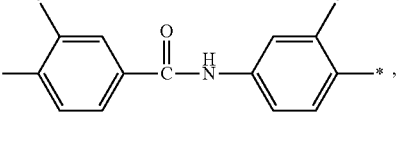
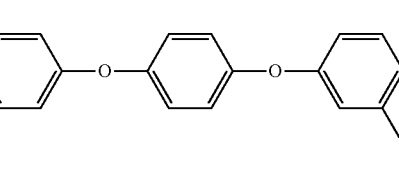
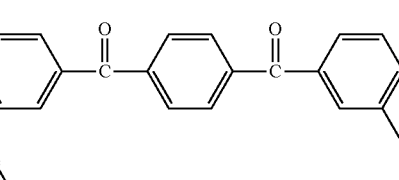
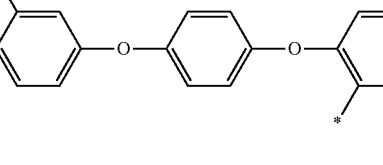
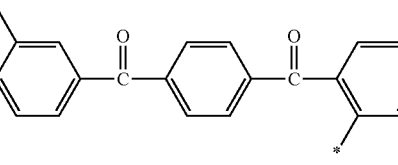
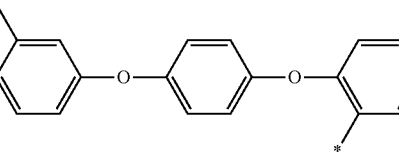

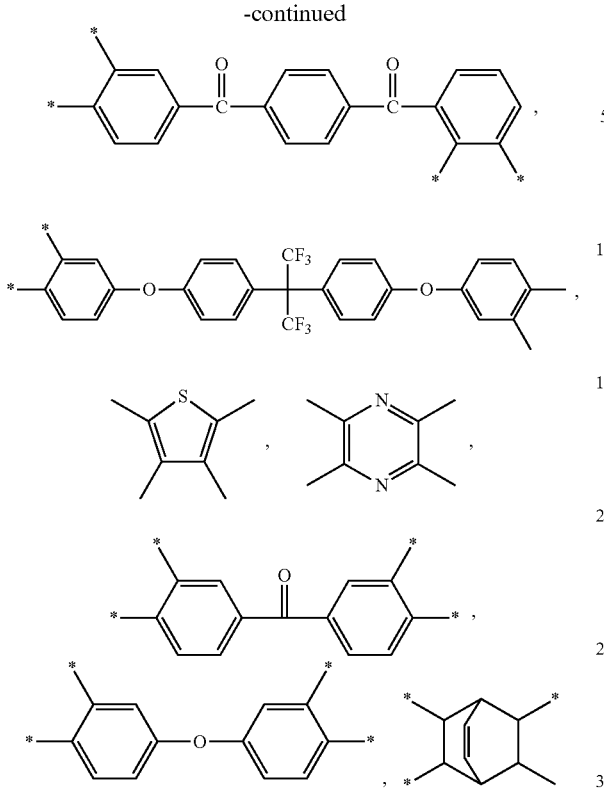

E in Chemical Formula 1 and Chemical Formula 2 may be represented by Chemical Formula 5:

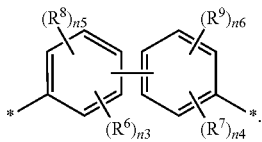

Chemical Formula 5

In Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, or —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, and n4 is an integer ranging from 1 to 4, n6 is an integer ranging from 0 to 3, provided that n4+n6 is an integer of 4 or less.

A in Chemical Formula 3 may be selected from chemical formulae of Group 3:

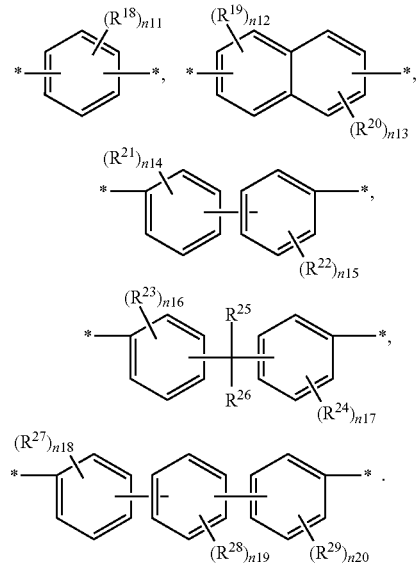

Group 3

In the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, and n12 and n13 are independently an integer ranging from 0 to 3.

A in Chemical Formula 3 may be selected from chemical formulae of Group 4:

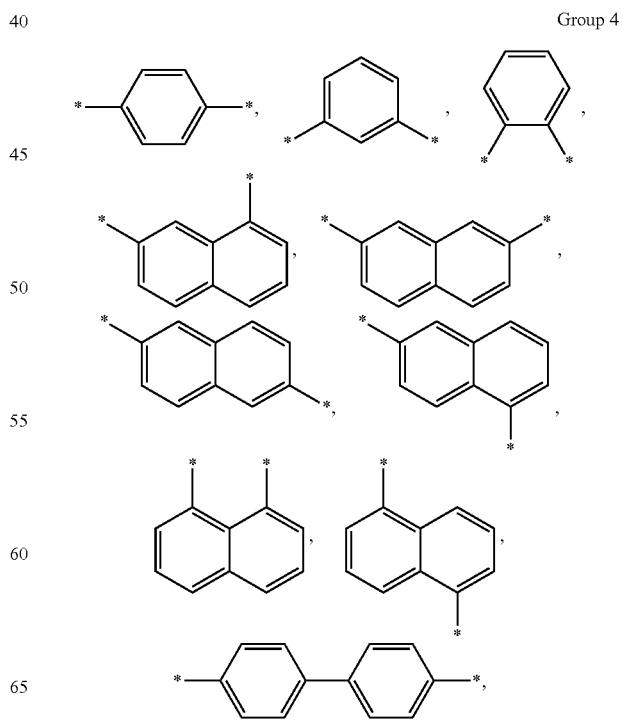

Group 4

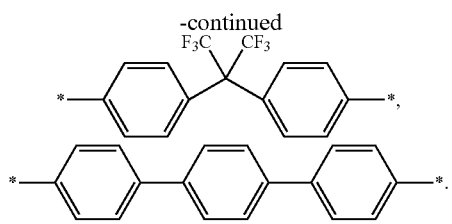

B in Chemical Formula 3 may be represented by Chemical Formula 5:

Chemical Formula 5

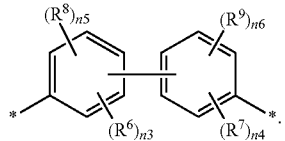

In Chemical Formula 5, $R^6$ and $R^7$ are the same or different and are independently an electron withdrawing group selected from —$CF_3$, —$CCl_3$, —$CBr_3$, —$CI_3$, —F, —Cl, —Br, —I, —$NO_2$, —CN, —$COCH_3$, or —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{296}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, and n4 is an integer ranging from 1 to 4, n6 is an integer ranging from 0 to 3, provided that n4+n6 is an integer of 4 or less.

The structural unit represented by Chemical Formula 1 may include at least one of a structural unit represented by Chemical Formula 9 and a structural unit represented by Chemical Formula 10:

Chemical Formula 9

Chemical Formula 10

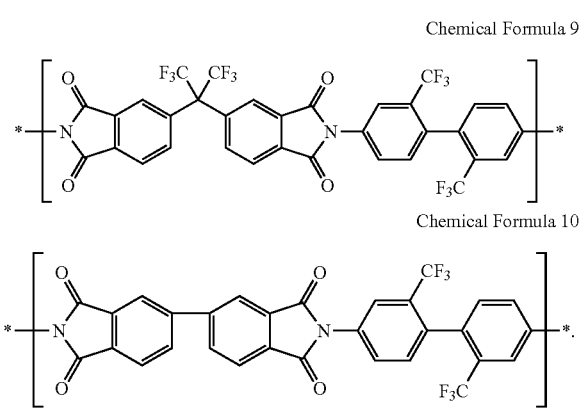

The structural unit represented by Chemical Formula 3 may include at least one of the structural units represented by Chemical Formula 6 to Chemical Formula 8:

Chemical Formula 6

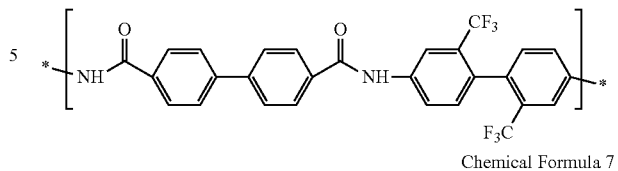

Chemical Formula 7

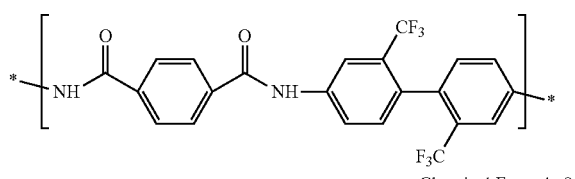

Chemical Formula 8

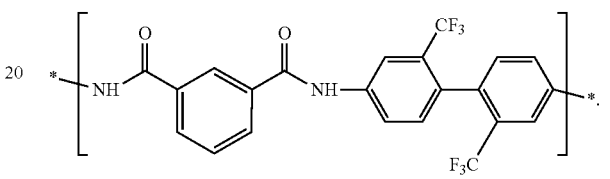

The composition may include a poly(imide-amide) copolymer including a structural unit represented by Chemical Formula 7, and at least one selected from a structural unit represented by Chemical Formula 9 and a structural unit represented by Chemical Formula 10, and a compound having a maximum absorption wavelength at about 570 nanometers or more in a visible radiation region in an amount of about 1 part per million to about 100 parts per million based on a weight of the poly(imide-amide) copolymer:

Chemical Formula 7

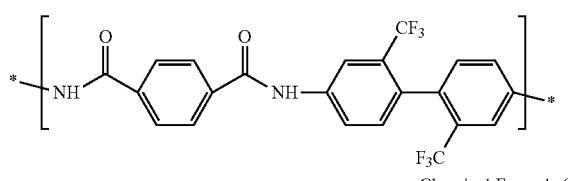

Chemical Formula 9

Chemical Formula 10

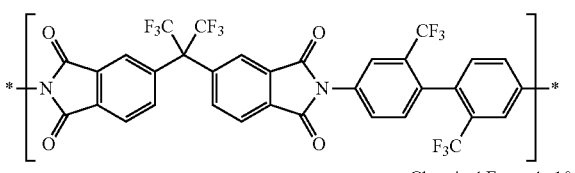

The compound having a maximum absorption wavelength at about 570 nanometers or more in a visible radiation region may be a blue pigment including copper phthalocyanine or a violet pigment including dioxazine violet.

The composition may include the structural unit represented by Chemical Formula 7, and the at least one selected from the structural unit represented by Chemical Formula 9 and the structural unit represented by Chemical Formula 10 in a mole ratio of about 20:80 to about 80:20.

Another embodiment provides an article, which comprises a curing product of the composition for preparing an article including a polyimide or poly(imide-amide) copolymer according to the embodiment.

The article may be a film that may have a yellow index of less than or equal to about 3.0 at a thickness of about 80 micrometers according to an ASTM E313 method using a UV spectrophotometer (Konica Minolta Inc., cm-3600d) and a tensile modulus of greater than about 4.5 gigapascals according to an ASTM D882 method.

The article may be a film that may have a total wavelength transmittance of greater than or equal to about 86% in a range of about 400 nanometers to about 750 nanometers, and may have a region where transmittance is decreased and then increased in a partial section of about 450 nanometers to about 700 nanometers.

The article may comprise a film and an additional coating layer disposed on at least one surface of the film.

Another embodiment provides a display device including the article according to the embodiment.

DETAILED DESCRIPTION

This disclosure will be described more fully hereinafter, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Mixture" as used herein is inclusive of all types of combinations, including blends, alloys, solutions, and the like.

As used herein, when a specific definition is not otherwise provided, the term "substituted" refers to a functional group substituted with at least one substituent selected from a halogen atom (F, Cl, Br, or I), a hydroxy group, a nitro group, a cyano group, an amino group ($-NH_2$, $-NH(R^{100})$ or $-N(R^{100})(R^{102})$, wherein $R^{100}$, $R^{101}$, and $R^{102}$ are the same or different, and are independently a C1 to 010 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group, and a substituted or unsubstituted heterocyclic group in place of at least one hydrogen of the given functional group, or the substituents may be linked to each other to provide a ring.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, and the term "alkenyl group" refers to a C2 to C30 alkenyl group, and specifically a C2 to C18 alkenyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when specific definition is not otherwise provided, the term "combination" refers to mixing or copolymerization. Herein, "copolymerization" refers to a random copolymerization, a block copolymerization, or a graft copolymerization.

As used herein, the terms "polyimide" and "polyamic acid" may be used to have the same meanings.

In addition, in the specification, "*" may refer to a point of attachment to nitrogen, carbon, or another atom.

A composition for preparing an article including a polyimide or poly(imide-amide) copolymer according to an embodiment includes:

(1) at least one of (i) a polyimide, a polyamic acid, or a poly(imide-amic acid) including at least one selected from a structural unit represented by Chemical Formula 1 and a structural unit represented by Chemical Formula 2; and (ii) a poly(imide-amide) copolymer, a poly(amic acid-amide) copolymer, or a poly(imide and amic acid-amide) copolymer including at least one selected from a structural unit represented by Chemical Formula 1 and a structural unit represented by Chemical Formula 2, and a structural unit represented by Chemical Formula 3, and (2) a compound having a maximum absorption wavelength at about 570 nanometers (nm) or more in a visible radiation region:

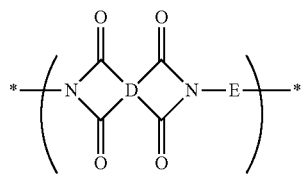

Chemical Formula 1

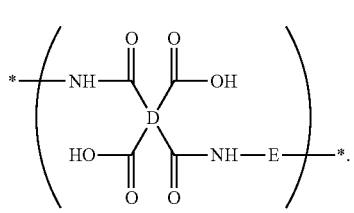

Chemical Formula 2

In Chemical Formulae 1 and 2,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and E is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"—(wherein, R' and R" are independently hydrogen, C1 to C10 aliphatic hydrocarbon group, C6 to C20 aromatic hydrocarbon group, or C6 to C20 alicyclic hydrocarbon group), —C(CF$_3$)$_2$—, —C(CF$_3$)(C$_6$H$_5$)—, or —C(=O)NH—.

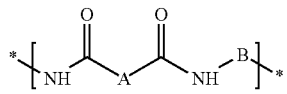

Chemical Formula 3

In Chemical Formula 3,

A and B are independently a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

As described above, a composition for preparing an article including a polyimide or poly(imide-amide) copolymer according to an embodiment includes:

(1) at least one of (i) the imide/and/or amic acid structural unit represented by Chemical Formula 1 and/or Chemical Formula 2, and (ii) a poly(imide and/or amic acid-amide) copolymer including the imide and/or amic acid structural unit and the structural unit represented by Chemical Formula 3, and (2) a compound having a maximum absorption wavelength at about 570 nm or more in a visible radiation region.

The polyimide or poly(imide-amide) copolymer has high light transmittance, thermal stability, mechanical strength, flexibility, and the like, and thus, may be useful as a display substrate material. In general, a display device is manufactured through a high temperature process at greater than or equal to about 350° C., such as a high temperature deposition, a high temperature annealing, and the like. The treatment at a high temperature of greater than or equal to a glass transition temperature rearranges polyimide or poly(imide-amide) molecules, which leads to packing of the polymer chains. Herein, the polyimide or poly(imide-amide) copolymer has a structure called a "charge transfer complex (CTC)", in which an electron donor and an electron acceptor are adjacent each other, and thus, a polyimide or poly(imide-amide) film absorbs light in a particular short wavelength region due to an electron movement (excitation) between potentials formed due to the CTC structure. Accordingly, as transmittance in a blue region of less than or equal to about 430 nm, which is essential for manufacturing a display, is remarkably deteriorated, the film becomes yellow. This is called as 'yellowing phenomenon' occurring due to the high temperature heat treatment, which makes it difficult to use the polyimide or poly(imide-amide) copolymer film in manufacturing a transparent device, which necessarily requires a high temperature process.

On the other hand, the increased packing among the polymer chains of the polyimide or poly(imide-amide) copolymer tends to increase surface hardness of a film formed of the copolymer, and thus, has a favorable effect of increasing mechanical properties of the film. However, the increased packing among the polymer chains also increases the yellow index of the film. In other words, the mechanical characteristics and the optical properties of the polyimide or poly(imide-amide) copolymer film have trade-off relationship, and accordingly, it is difficult to improve the yellow index of the film, while maintaining a high tensile modulus and pencil hardness of the film.

As for the composition according to the embodiment, since the composition includes a compound having a maximum absorption wavelength at about 570 nm or more in a visible radiation region, it may effectively improve optical properties, for example, reduce a yellow index without deteriorating mechanical properties of a film formed of the composition.

The compound having a maximum absorption wavelength at about 570 nm or more in a visible radiation region may be, for example, a blue pigment or a violet pigment, but has no particular limit as long as it has a maximum absorption wavelength at about 570 nm or more in a visible radiation region.

The blue pigment may include, for example, a metal phthalocyanine-based pigment, an indanthrone-based pigment, an indophenol-based pigment, and the like, and may be, for example, a phthalocyanine metal complex such as copper phthalocyanine, or chloro copper phthalocyanine, chloro aluminum phthalocyanine, titanyl phthalocyanine, vanadic acid phthalocyanine, magnesium phthalocyanine, zinc phthalocyanine, iron phthalocyanine, cobalt phthalocyanine, and the like.

The violet pigment may include dioxazine violet, first violet B, methyl violet, indanthrene brilliant violet, and the like, and the violet pigment may be, for example, dioxazine violet, but is not limited thereto.

The compound having a maximum absorption wavelength at about 570 nm or more in a visible radiation region may be included in an amount of about 1 part per million (ppm) to about 100 parts per million (ppm), for example, about 1 ppm to about 95 ppm, for example, about 1 ppm to about 90 ppm, for example, about 1 ppm to about 85 ppm, for example, about 2 ppm to about 90 ppm, for example, about 2 ppm to about 85 ppm, for example, about 2 ppm to about 80 ppm, for example, about 3 ppm to about 90 ppm, for example, about 3 ppm to about 85 ppm, for example, about 3 ppm to about 80 ppm, for example, about 4 ppm to about 90 ppm, for example, about 4 ppm to about 85 ppm, for example, about 4 ppm to about 80 ppm, for example, about 4 ppm to about 75 ppm, for example, about 4 ppm to about 70 ppm, for example, about 5 ppm to about 90 ppm, for example, about 5 ppm to about 85 ppm, for example, about 5 ppm to about 80 ppm, for example, about 5 ppm to about 75 ppm, for example, about 5 ppm to about 70 ppm, for example, about 5 ppm to about 65 ppm, for example, about 5 ppm to about 60 ppm, for example, about 5 ppm to about 55 ppm, for example, about 5 ppm to about 50 ppm, for example, about 5 ppm to about 45 ppm, for example, about 5 ppm to about 40 ppm, for example, about 5 ppm to about 35 ppm, for example, about 5 ppm to about 30 ppm based on the weight of the polyimide or poly(imide-amide) copolymer.

The compound is included in a very small amount based on the weight of the polyimide or poly(imide-amide) copolymer as aforementioned, and thus, has no influence on other properties of the film, for example, mechanical properties such as tensile modulus and pencil hardness, while effecting improvement of the yellow index (YI) of the film. For example, as shown in the Examples described below, a film formed by adding copper phthalocyanine as the blue pigment or dioxazine violet as the violet pigment in each amount of about 5 ppm to about 90 ppm based on the weight of the poly(imide-amide) shows a color coordinate change in a CIE Lab color system compared with a polyimide or poly(imide-amide) copolymer film according to Comparative Example, which includes no pigments. In addition, the yellow index (YI) of the film due to this color coordinate change is decreased compared with the yellow index (YI) of the film including no pigment.

The CIE Lab color system shows brightness L and chromaticity a* and b*, each indicating a color and a chroma, and herein, the +a* indicates red, −a* indicates green, +b* indicates yellow, and −b* indicates blue, and as the +b* indicating yellow decreases, a yellow index decreases.

When the blue pigment, that is, copper phthalocyanine is added in each amount of about 5 ppm, about 10 ppm, about 20 ppm, about 30 ppm, and about 40 ppm based on the weight of the polymer according to Examples 1 to 5, as the amount of the pigment is increased, the value of b* decreases. In addition, when the violet pigment, that is, dioxazine violet is added in each amount of about 5 ppm, about 10 ppm, about 20 ppm, about 30 ppm, and about 90 ppm based on the weight of the polymer according to Examples 6 to 10, as the amount of the pigment is increased, the value of b* also decreases. In other words, when these blue and violet pigments are included within the above ranges, the yellow index of the film is decreased compared with the film including no pigments according to Comparative Example 1. In other words, both pigments remarkably decrease a yellow index, and for example, the blue pigment decreases a yellow index by about 0.6 to about 3.4 in proportion to the amount compared with the film of Comparative Example 1, while the violet pigment decreases a yellow index by about 0.7 to about 3.3 in proportion to the amount compared with the film of Comparative Example 1.

On the other hand, when the pigments are added, other optical properties of the film such as light transmittance, haze, or the like are rarely deteriorated, and mechanical properties of the film such as a tensile modulus and pencil hardness show almost no change. Accordingly, the composition according to the embodiment may be used to improve optical properties and in particular, to decrease a yellow index (YI) of the film without deteriorating mechanical properties.

The poly(imide and/or amic acid) of the composition according to the embodiment includes the imide structural unit represented by Chemical Formula 1, or the amic acid structural unit represented by Chemical Formula 2, or the imide and/or amic acid structural unit including the structural unit represented by Chemical Formula 1 and the structural unit represented by Chemical Formula 2. When the amic acid structural unit is included, it may be partially imidized through a chemical and/or thermal imidization process before film casting, or may be converted into an imide structural unit through heat treatment after the film casting.

The poly(imide and/or amic acid-amide) copolymer of the composition according to the embodiment includes an imide structural unit represented by Chemical Formula 1 and/or an amic acid structural unit represented by Chemical Formula 2, and an amide structural unit represented by Chemical Formula 3.

D in Chemical Formula 1 and Chemical Formula 2 may be selected from chemical formulae of Group 1:

Group 1

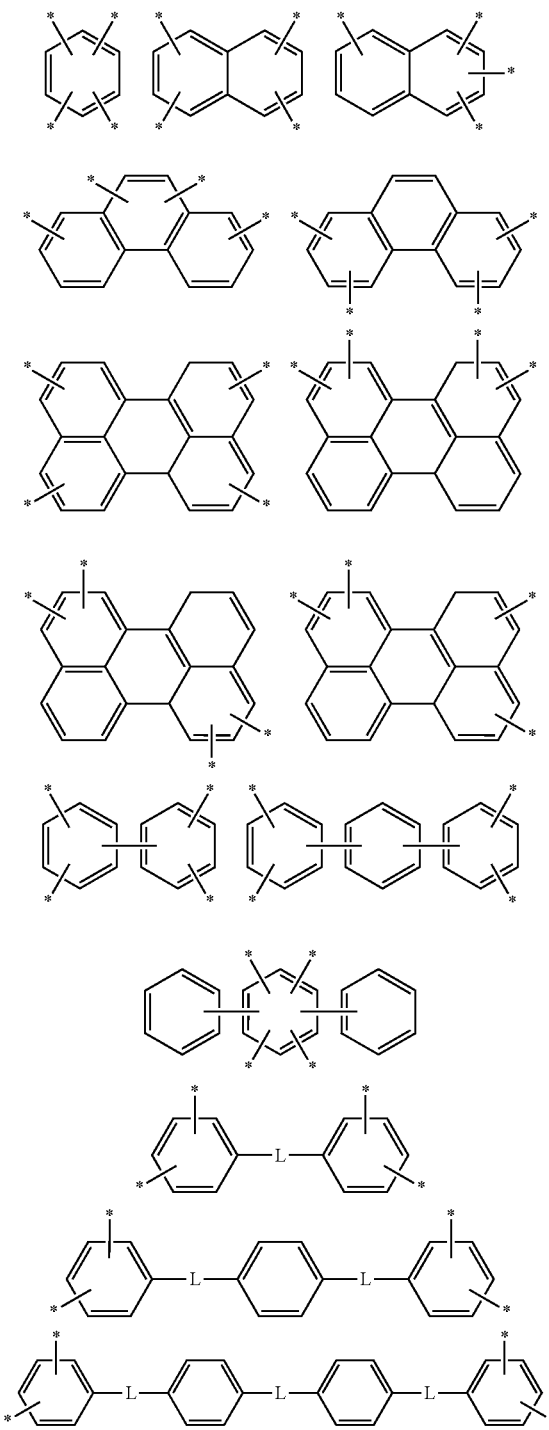

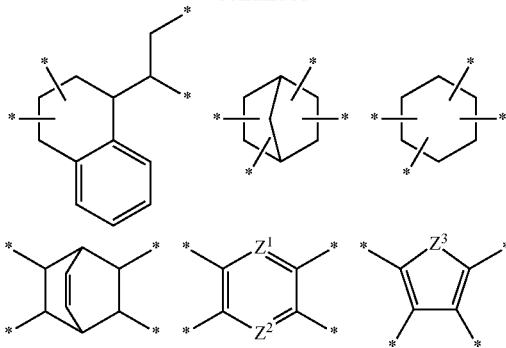

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—, * is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

The chemical formulae of Group 1 may be represented by the chemical formulae of Group 2, but are not limited thereto:

Group 2

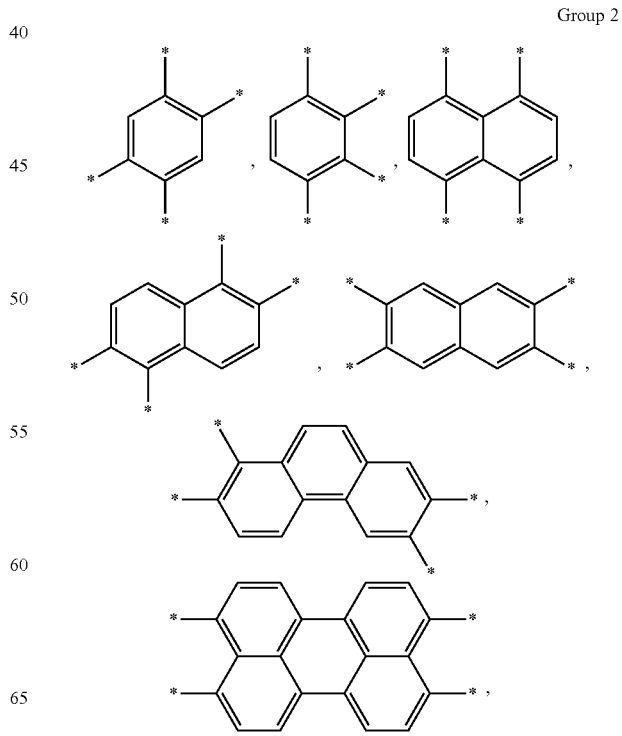

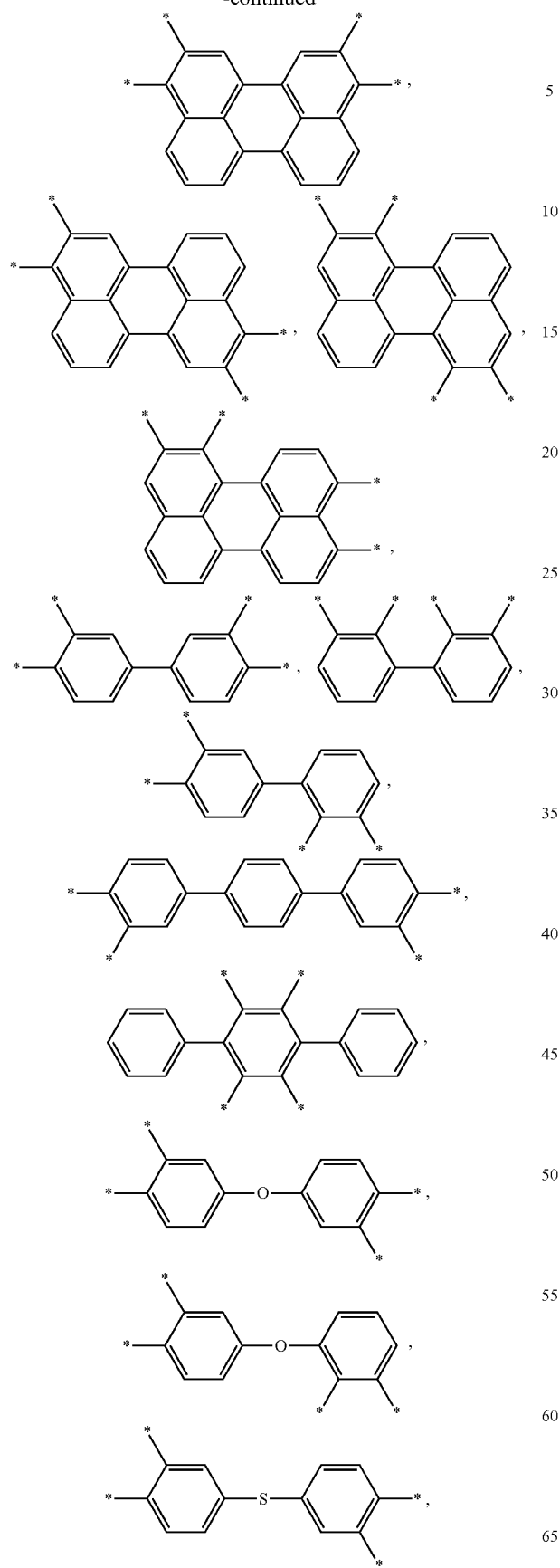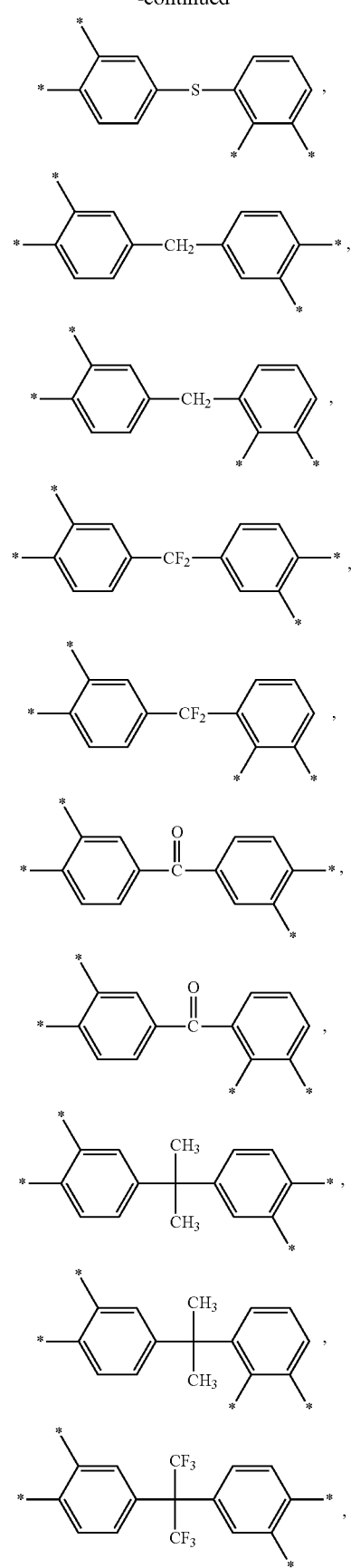

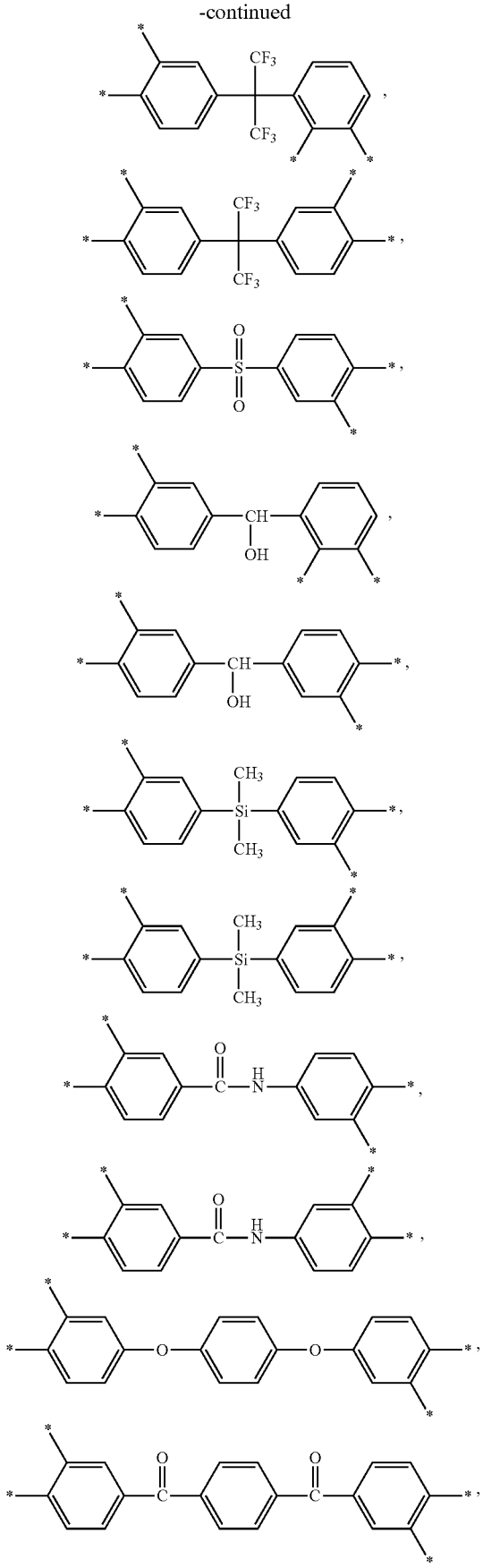

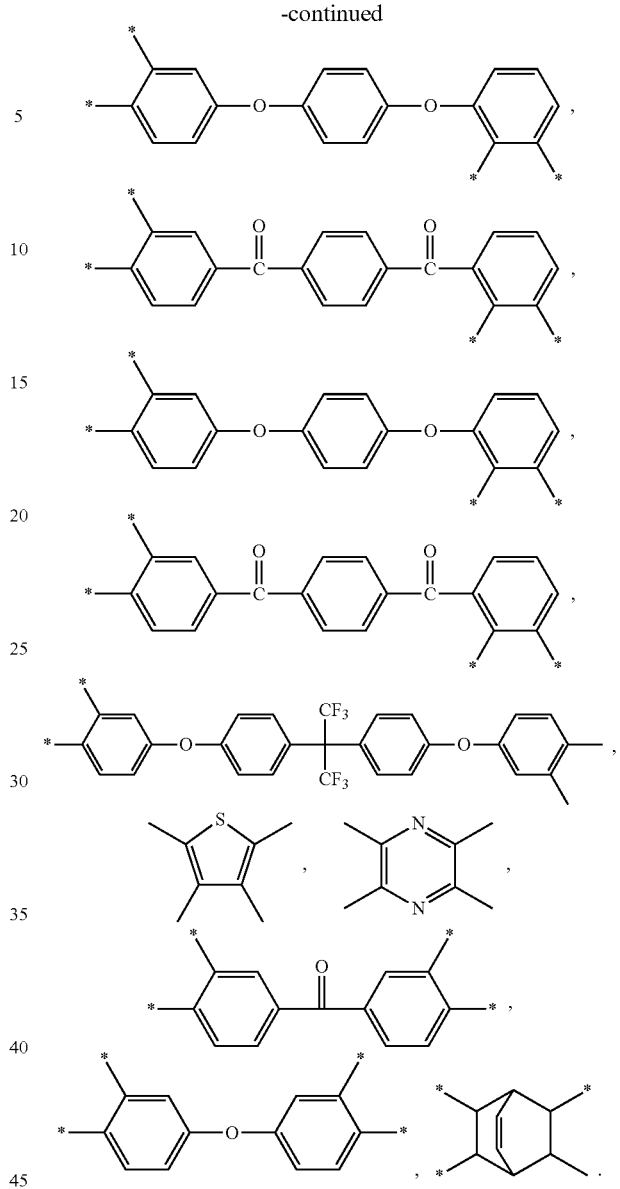

E in Chemical Formula 1 and Chemical Formula 2 may be represented by Chemical Formula 5:

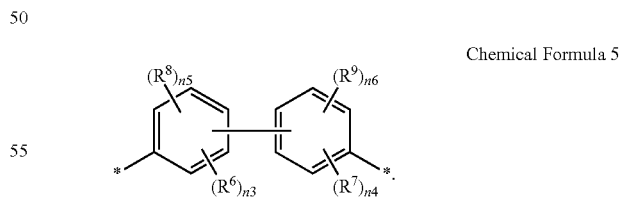

Chemical Formula 5

In Chemical Formula 5, $R^6$ and $R^7$ are the same or different and are independently an electron withdrawing group, for example, —$CF_3$, —$CCl_3$, —$CBr_3$, —$CI_3$, —F, —Cl, —Br, —I, —$NO_2$, —CN, —$COCH_3$, or —$CO_2C_2H_5$, $R^8$ and $R^9$ are the same or different and are independently a halogen, a hydroxy group, an alkoxy group (—$OR^{294}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, and n4 is an integer ranging from 1 to 4, n6 is an integer ranging from 0 to 3, provided that n4+n6 is an integer of 4 or less.

In an exemplary embodiment, A in Chemical Formula 3 may be selected from chemical formulae represented by Group 3:

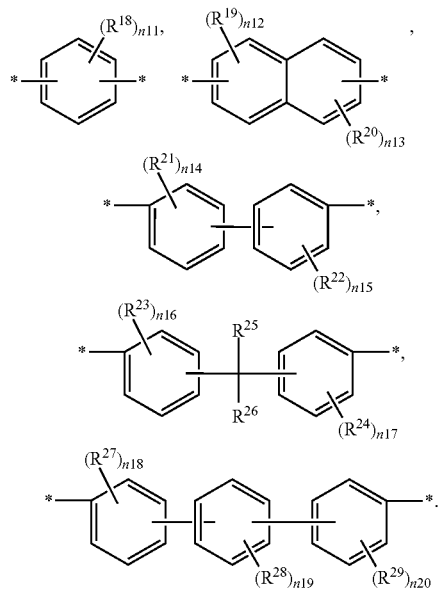

Group 3

In the chemical formulae represented by Group 3, $R^{18}$ to $R^{29}$ are the same or different and are independently deuterium, a halogen, a substituted or unsubstituted 01 to 010 aliphatic organic group, or a substituted or unsubstituted C6 to C20 aromatic organic group, n11 and n14 to n20 are independently an integer ranging from 0 to 4, and n12 and n13 are independently an integer ranging from 0 to 3.

In an exemplary embodiment, the chemical formulae of Group 3 may be, for example, represented by chemical formulae of Group 4, but are not limited thereto:

Group 4

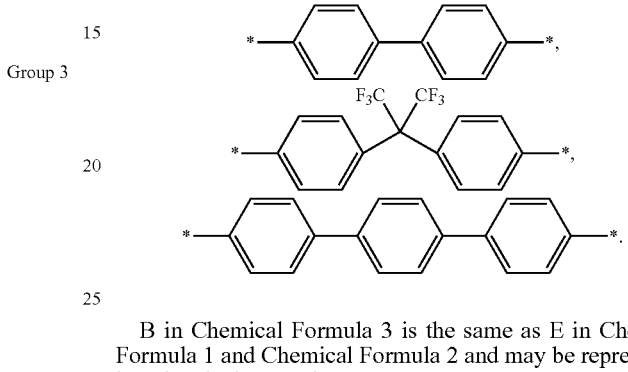

B in Chemical Formula 3 is the same as E in Chemical Formula 1 and Chemical Formula 2 and may be represented by Chemical Formula 5:

Chemical Formula 5

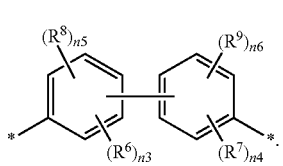

In Chemical Formula 5, $R^6$ to $R^9$ and n3 to n6 are the same as defined above.

In an exemplary embodiment, the structural unit represented by Chemical Formula 1 may include at least one selected from a structural unit represented by Chemical Formula 9 and a structural unit represented by Chemical Formula 10:

Chemical Formula 9

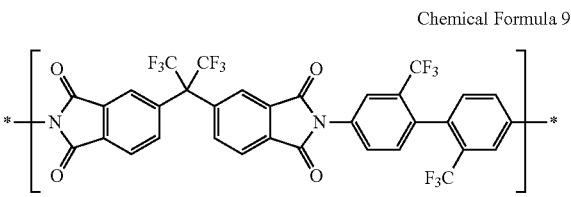

Chemical Formula 10

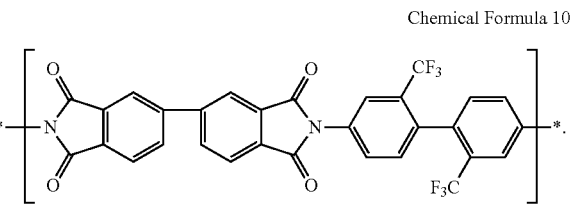

In an exemplary embodiment, the structural unit represented by Chemical Formula 3 may include at least one selected from structural units represented by Chemical Formula 6 to Chemical Formula 8:

Chemical Formula 6

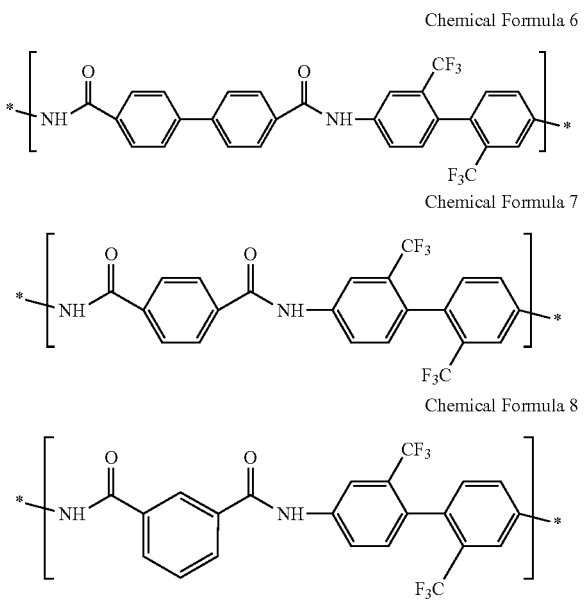

Chemical Formula 7

Chemical Formula 8

In an exemplary embodiment, a composition for preparing an article including a poly(imide-amide) copolymer includes a poly(imide-amide) copolymer including a structural unit represented by Chemical Formula 7, and at least one selected from a structural unit represented by Chemical Formula 9 and a structural unit represented by Chemical Formula 10, and a compound having a maximum absorption wavelength at about 570 nm or more in a visible radiation region in an amount of about 1 ppm to about 100 ppm based on a weight of the poly(imide-amide) copolymer:

Chemical Formula 7

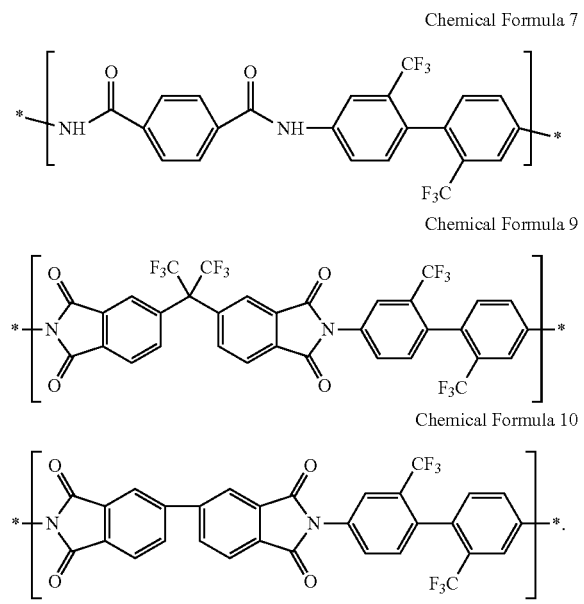

Chemical Formula 9

Chemical Formula 10

The compound having a maximum absorption wavelength at about 570 nm or more in a visible radiation region may be a blue pigment including a metal phthalocyanine-based pigment, an indanthrone-based pigment, and an indophenol-based pigment, for example, a phthalocyanine metal complex such as copper phthalocyanine, chloro copper phthalocyanine, chloro aluminum phthalocyanine, titanyl phthalocyanine, vanadic acid phthalocyanine, magnesium phthalocyanine, zinc phthalocyanine, iron phthalocyanine, cobalt phthalocyanine, and the like.

The compound having a maximum absorption wavelength at about 570 nm or more in a visible radiation region may be a violet pigment including dioxazine violet, first violet B, methyl violet, indanthrene brilliant violet, and the like, for example, may be dioxazine violet.

The blue pigment or violet pigment may be included in an amount of about 1 ppm to about 100 ppm, for example, about 1 ppm to about 95 ppm, for example, about 1 ppm to about 90 ppm, for example, about 1 ppm to about 85 ppm, for example, about 2 ppm to about 90 ppm, for example, about 2 ppm to about 85 ppm, for example, about 2 ppm to about 80 ppm, for example, about 3 ppm to about 90 ppm, for example, about 3 ppm to about 85 ppm, for example, about 3 ppm to about 80 ppm, for example, about 4 ppm to about 90 ppm, for example, about 4 ppm to about 85 ppm, for example, about 4 ppm to about 80 ppm, for example, about 4 ppm to about 75 ppm, for example, about 4 ppm to about 70 ppm, for example, about 5 ppm to about 90 ppm, for example, about 5 ppm to about 85 ppm, for example, about 5 ppm to about 80 ppm, for example, about 5 ppm to about 75 ppm, for example, about 5 ppm to about 70 ppm, for example, about 5 ppm to about 65 ppm, for example, about 5 ppm to about 60 ppm, for example, about 5 ppm to about 55 ppm, for example, about 5 ppm to about 50 ppm, for example, about 5 ppm to about 45 ppm, for example, about 5 ppm to about 40 ppm, for example, about 5 ppm to about 35 ppm, for example, about 5 ppm to about 30 ppm based on the weight of the poly(imide-amide) copolymer.

In an exemplary embodiment, the poly(imide-amide) copolymer may include the structural unit represented by Chemical Formula 7 and the at least one selected from the structural unit represented by Chemical Formula 9 and the structural unit represented by Chemical Formula 10 in a mole ratio of about 20:80 to about 80:20.

The poly(imide and/or amic acid) or poly(imide and/or amic acid-amide) copolymer having the structural formulae may easily be prepared by polymerization of monomers by known poly(imide and/or amic acid) and polyamide manufacturing methods in this art.

For example, the imide and/or amic acid structural unit may be prepared by reacting diamine with dianhydride in an organic solvent.

Examples of the diamine compound may include at least one selected from 2,2'-bistrifluoromethyl-4,4'-biphenyl-diamine (TFDB); m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis (4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4, 4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantine; bis[2-(3-aminophenyl) hexafluoroisopropyl] diphenyl ether; 3,3'-diamino-1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminobicyclohexylmethane, and diaminofluorene. Such diamine compounds may be commercially available or may be obtained by a well-known method.

For example, the diamine compound may be selected from compounds of the following structures:

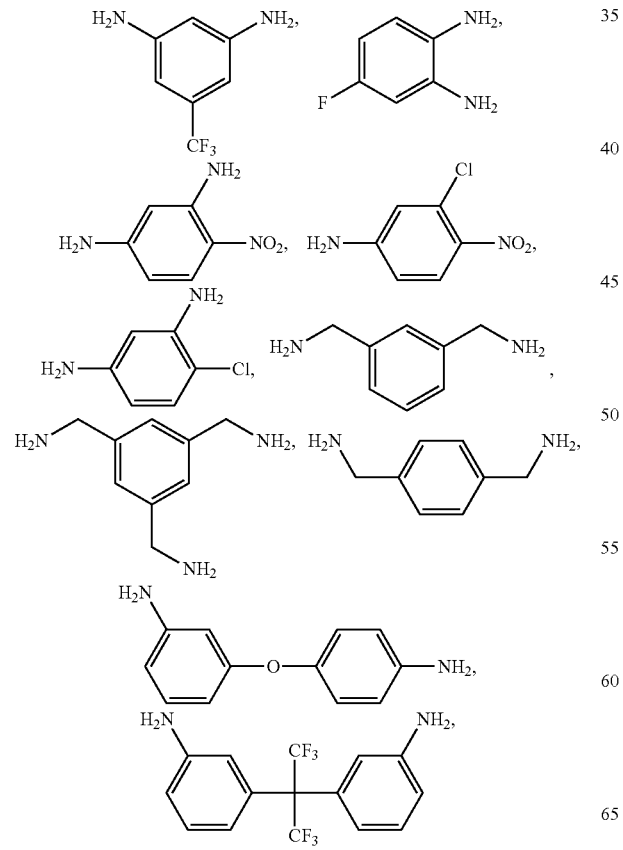

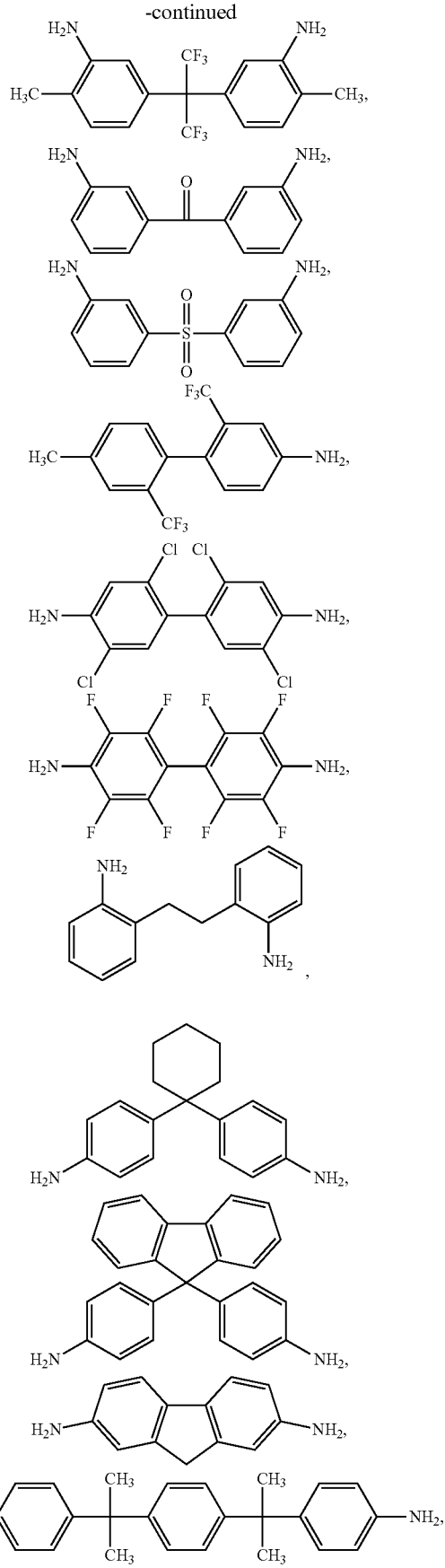

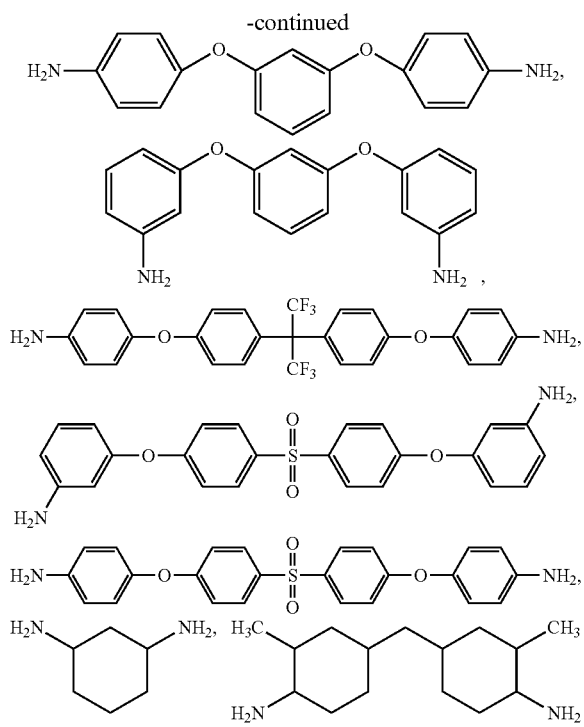

In exemplary embodiment, the diamine may be 2,2'-bis(trifluoromethyl)benzidine (TFDB).

The dianhydride may be a tetracarboxylic dianhydride, and such a compound may be 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenyl sulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-biphenyl tetracarboxylic dianhydride; 4,4'-bis(3,4-dicarboxyphenoxy)biphenyl dianhydride; bis(2,3-dicarboxylphenyl) ether dianhydride; 4,4'-bis(2,3-dicarboxyphenoxy) diphenyl ether dianhydride; 4,4'-bis(3,4-dicarboxyphenoxy) diphenyl ether dianhydride; bis(3,4-dicarboxylphenyl) sulfide dianhydride; 4,4'-bis(2,3-dicarboxyphenoxy) diphenyl sulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenyl sulfone dianhydride; 4,4'-bis(3,4-dicarboxylphenoxy) diphenyl sulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy) phenyl] propane dianhydride; 2,2-bis[4-(3,4-dicarboxylphenoxy) phenyl] propane dianhydride; 2,2-bis[4-(2,3-dicarboxylphenoxy)-4'-(3,4-dicarboxylphenoxy) diphenyl] propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis[4-(3,4-dicarboxylphenoxy) phenyl]-1-phenyl-2,2,2-trifluoroethane dianhydride; and 4,4'-bis[2-(3,4-dicarboxylphenyl)hexafluoroisopropyl] diphenyl ether dianhydride. Such anhydride compounds may be commercially available or may be obtained by a well-known method.

In exemplary embodiment, the tetracarboxylic acid dianhydride may be 3,3',4,4'-biphenyl tetracarboxylic dianhydride (BPDA), 4,4'-(hexafluoroisopropylidene) diphthalic anhydride (6FDA), or a combination thereof.

On the other hand, the well-known polyamide manufacturing method may include low temperature solution polymerization, interface polymerization, fusion polymerization, solid-phase polymerization, and the like. For example, the low temperature solution polymerization may be performed by reacting a dicarboxylic dihalide and a diamine in an aprotic polar solvent to form the amide structural unit represented by Chemical Formula 3.

The dicarboxylic dihalide may be at least one selected from terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoroterephthaloyl chloride, and a combination thereof.

In an exemplary embodiment, the dicarboxylic dihalide may be terephthaloyl chloride (TPCl).

A diamine for forming the amide structural unit may be the same diamine compound as used for forming the imide and/or amic acid structural unit. In other words, the amide structural unit may be formed by using at least one kind of the same or different diamine among the aforementioned diamine compounds.

In an exemplary embodiment, diamine for forming an amide structural unit with the dicarboxylic dihalide may be 2,2'-bis(trifluoromethyl)benzidine (TFDB).

The aprotic polar solvent may be, for example, a sulfoxide based solvent such as dimethyl sulfoxide, diethyl sulfoxide and the like, a formamide based solvent such as N,N-dimethyl formamide, N,N-diethylformamide, and the like, an acetamide based solvent such as N,N-dimethyl acetamide, N,N-diethylacetamide and the like, a pyrrolidone based solvent such as N-methyl-2-pyrrolidone, N-vinyl-2-pyrrolidone and the like, a phenol based solvent such as phenol, o-, m- or p-cresol, xylenol, halogenated phenol, catechol, and the like, or hexamethylphosphoramide, γ-butyrolactone, and the like. These solvents may be used alone or as a mixture. However, the examples of solvents are not limited thereto, and an aromatic hydrocarbon such as xylene and toluene may also be used.

The amide structural unit is formed by placing a diamine and a dicarboxylic dihalide in the same reactor and allowing them to react. The diamine and dianhydride for forming the imide and/or amic acid structural unit are then added thereto and reacted therewith to prepare a poly(amic acid-amide) copolymer.

Alternatively, the diamine and the dicarboxylic dihalide for forming the amide structural unit are reacted to prepare an amide oligomer having an amino group at both ends thereof, and a dianhydride is added to the resultant, which is used as a diamine monomer, to prepare a poly(amic acid-amide) copolymer. The latter method may require no precipitation process for removing HCl generated from a process of forming amide, and thus, the method may shorten a process time and increase a yield of producing a final product, the poly(amide-imide) copolymer.

The polyamic acid or poly(amic acid-amide) copolymer may be optionally partially or completely chemically or thermally imidized, to prepare a poly(imide and/or amic acid-amic acid) or poly(imide and/or amic acid amic acid-amide) copolymer, and the compound having a maximum absorption wavelength at about 570 nm or more in a visible radiation region, for example, a blue pigment or a violet pigment, is added in an amount of about 1 ppm to about 100 ppm based on the weight of the poly(imide and/or amic acid amic acid) or poly(imide and/or amic acid amic acid-amide) copolymer to prepare a composition for preparing a poly-imide or poly(imide-amide) copolymer according to an embodiment.

The composition for preparing a polyimide or poly(imide-amide) copolymer is coated on a substrate and the like by a well-known coating method, and then, dried and cured in the presence of heat or the like to manufacture an article such as a film.

As described above, the prepared film has a decreased yellow index without decreasing mechanical properties compared with a film consisting of only a polyimide or poly(imide-amide) copolymer. In an exemplary embodiment, a film prepared of the poly(imide-amide) copolymer may have a yellow index (YI) of less than or equal to about 3.0 at a thickness of about 80 micrometers (μm) according to an ASTM E313 method using a UV spectrophotometer (Konica Minolta Inc., cm-3600d). In addition, after exposing the film to an ultraviolet (UVB) for 72 hours, a yellow index difference (ΔYI) before and after the exposure is less than or equal to about 1. Herein, the film has a tensile modulus of greater than about 4.5 gigapascals (GPa) and a pencil hardness of H or more.

The film may have a high total wavelength transmittance of greater than or equal to about 86% in range of about 400 nm to about 750 nm.

In addition, the film has a region where transmittance decreases and then, increases again in a partial section of a wavelength range of about 450 nm to about 700 nm. In general, a polyimide or poly(imide-amide) copolymer film shows high transmittance of greater than or equal to about 85% in a wavelength range of greater than or equal to about 450 nm, and this high transmittance is almost the same or uniform over the entire section in the wavelength range of greater than or equal to about 450 nm. However, when the polyimide or poly(imide-amide) copolymer prepared by addition of the compound having a maximum absorption wavelength at about 570 nm or more in a visible radiation region, for example, the blue pigment or the violet pigment to the poly(imide and/or amic acid) or poly(imide and/or amic acid-amide) copolymer according to the embodiment is used to manufacture a film, the film has a region where transmittance of the film decreases by greater than or equal to about 0.1% and increases again in a partial section of a wavelength range of about 450 nm to about 700 nm. This phenomenon is not found in the former film formed of the polyimide or poly(imide-amide) copolymer including no compound having a maximum absorption wavelength at about greater than or equal to 570 nm in a visible radiation region, for example, the blue pigment or the violet pigment. Without wanting to be bound by a particular theory, it is believed that the composition according to an embodiment including the compound having a maximum absorption wavelength at about 570 nm or more in a visible radiation region, for example, the blue pigment or the violet pigment has a region where transmittance decreases by greater than or equal to about 0.1% and increases back again in a partial section of wavelength range of about 450 nm to about 700 nm. Accordingly, transmittance of the film is somewhat decreased in the corresponding region, but the entire yellow index of the film is reduced.

Accordingly, the film may have high transparency and high surface hardness due to much decreased yellow index without deteriorating mechanical properties, and thus, may be used as a window film and the like for a flexible display device. When the film is used as a window film and the like for a flexible display device, an additional hard coating layer may further be disposed on at least one surface thereof. The additional hard coating layer may include an acrylate-based polymer, polycaprolactone, a urethane-acrylate copolymer, polyrotaxane, an epoxy resin, polysilsesquioxane, or a combination thereof, but is not limited thereto.

Hereafter, this disclosure is described in detail with reference to examples. The following examples and comparative examples are not restrictive, but are illustrative.

EXAMPLE

Synthesis Example 1: Preparation of Poly(imide-amide) Copolymer 63 kilograms (kg) of dimethyl acetamide is placed in a reactor, and 907 grams (g) of pyridine is added thereto under a nitrogen atmosphere. Next, 3,671 g of 2,2'-bis(trifluoromethyl)-4,4'-biphenyldiamine (TFDB) is placed in the reactor and dissolved, preparing a TFDB solution. Subsequently, 1,164 g of terephthaloyl chloride (TPCL) is added to the TFDB solution, and the mixture is stirred at 30° C. for 3 hours to obtain an amide oligomer solution. The obtained solution is treated with water to obtain a precipitate, and the precipitate is dried at 80° C. for 48 hours to obtain amide oligomer powder. 4,500 g of the amide oligomer powder, 1,375 g of 4,4'-hexafluoroisopropylidene diphthalic anhydride (6FDA), and 775 g of 3,3',4,4'-biphenyltetracarboxylic dianhydride (BPDA) are added to 37.6 kg of dimethyl acetamide, and the mixture is allowed to react at 30° C. for 48 hours to obtain a poly(amic acid-amide) copolymer solution.

Then, 1,173 g of acetic anhydride as a chemical imidization catalyst is added to the poly(amic acid-amide) solution, and the mixture is stirred for 30 minutes. 1,374 g of pyridine is added thereto, and the obtained mixture is stirred at 30° C. for 24 hours, to prepare a poly(imide-amide) copolymer solution.

Examples 1 to 5: Preparation of Copper Phthalocyanine-Containing Poly(Imide-Amide) Copolymer Film A blue pigment of copper phthalocyanine (CuPc) (Tradename MBC, IRIDOS Co., Ltd.) in an amount provided in Table 1 based on 100 parts by weight of a copolymer solid in the poly(imide-amide) copolymer solution of Synthesis Example 1 is respectively added to the poly(imide-amide) copolymer solution, and the mixture is stirred for about 30 minutes to prepare each poly(imide-amide) copolymer solution including the blue pigment according to Examples 1 to 5.

The prepared copolymer solution is coated on a glass plate to cast a film. The film is dried on a hot plate at 130° C. for 40 minutes, heated up to 280° C. in a furnace at a speed of 10° C./min, and then, slowly cooled down. Lastly, the poly(imide-amide) copolymer film is separated from the glass plate.

Then, yellow index (YI), L, and b* of each 80 micrometer-thick (μm-thick) film obtained therefrom are measured according to an ASTM E313 method by using a spectrophotometer, CM-3600d made by Konica Minolta Inc., and the results are provided in Table 1.

In addition, total light (400 nanometers (nm) to 750 nm) transmittance, haze, tensile modulus, and pencil hardness of the film are respectively measured by the following method, and the results are provided in Table 2. Furthermore, the film is exposed to an ultraviolet (UV) lamp of a UVB wavelength region for 72 hours, and a YI difference before and after the exposure, that is ΔYI, is also provided.

(1) Film Thickness

The thickness of the film is measured by using Micrometer (Mitutoyo Corp.).

(2) Modulus

The modulus of the film is measured according to an ASTM D882 method by using an Instron equipment. A 1 centimeter-wide (cm-wide) and 5 centimeter-long (cm-long) film specimen is prepared, and the modulus of the film specimen is measured at room temperature at an elongation speed of 25 millimeters per minute (mm/min).

(3) Pencil Hardness

The pencil scratch hardness of the film is measured by using a pencil hardness meter and a Mitsubishi pencil at a pencil speed of 60 mm/min with a vertical load of 1 kilogram (kg) to perform five times repeat of measurement and finding a hardness without a defect.

(4) Transmittance, Yellow Index (YI), and Haze

Transmittance, yellow index (YI), and haze are measured using UV spectrophotometer (Konica Minolta Inc., cm-3600d) according to ASTM E313.

(5) Yellow Index (YI) after Radiating UV

A yellow index difference (after radiating UV–before radiating UV) of the film before and after exposing the film to an ultraviolet (UV) lamp of a UVB wavelength region for 72 hours (greater than or equal to 200 millijoules per square centimeter, mJ/cm²) is measured.

Example 6 to Example 10: Preparation of Dioxazine Violet-Containing Poly(Imide-Amide) Copolymer Film A violet pigment of dioxazine violet (Tradename: Violet Pigment, MVC, Iridos Co., Ltd.) in each amount provided in Table 1 based on 100 parts by weight of a copolymer solid in the poly(imide-amide) copolymer solution according to Synthesis Example 1 is added thereto, and each mixture is stirred for about 30 minutes, preparing each poly(imide-amide) copolymer solution including the violet pigment according to Examples 6 to 10.

The prepared copolymer solution is coated on a glass plate to cast a film. The film is dried on a hot plate at 130° C. for 40 minutes, heated up to 280° C. in a furnace at a speed of 10 degree Centigrade per minute (° C./min), and then, slowly cooled down. Lastly, the poly(imide-amide) copolymer film is separated from the glass plate.

A yellow index (YI), L, and b* of the film are measured according to E313 by using a spectrophotometer, CM-3600d made by Konica Minolta, Inc. and provided in Table 1.

In addition, transmittance, haze, YI and ΔYI, tensile modulus, and pencil hardness of the film are respectively measured in a method described in Examples 1 to 5 and provided in Table 2.

Comparative Example 1: Preparation of Poly(Imide-Amide) Copolymer Film without Pigment A film is manufactured in the same method as Examples 1 to 10 by using the poly(imide-amide) copolymer solution according to Synthesis Example 1 except for using no pigment, and yellow index (YI), L, and b* of the film are measured according to E313 by using a spectrophotometer, CM-3600d made by Konica Minolta, Inc. and provided in Table 1. In addition, transmittance, haze, YI and ΔYI, tensile modulus, and pencil hardness of the film are respectively measured according to the same method as Examples 1 to 10 and provided in Table 2.

TABLE 1

|  | Pigment | Amount of pigment (ppm) | L | b* | YI |
| --- | --- | --- | --- | --- | --- |
| Comparative Example 1 | — | 0 | 95.26 | 1.9 | 3.4 |
| Example 1 | CuPc | 5 | 95.2 | 1.7 | 2.8 |
| Example 2 | CuPc | 10 | 95.1 | 1.6 | 2.4 |
| Example 3 | CuPc | 20 | 94.92 | 1.4 | 1.8 |
| Example 4 | CuPc | 30 | 94.75 | 0.9 | 0.7 |
| Example 5 | CuPc | 40 | 94.6 | 0.7 | 0 |
| Example 6 | Dioxazine violet | 5 | 95.3 | 1.5 | 2.7 |
| Example 7 | Dioxazine violet | 10 | 95.2 | 1.5 | 2.6 |
| Example 8 | Dioxazine violet | 20 | 95.0 | 1.2 | 2.2 |
| Example 9 | Dioxazine violet | 30 | 94.9 | 1 | 1.8 |
| Example 10 | Dioxazine violet | 90 | 94.9 | −0.4 | 0.1 |

Referring to the results of Table 1, as the blue pigment and the violet pigment are added, the b* in a CIE Lab color system is decreased, and thus, yellowness of the poly(imide-amide) copolymer film is decreased. As a result, the yellow index of the film is substantially reduced compared with YI of the film that does not include the pigments according to Comparative Example 1.

TABLE 2

|  | Pigment | Amount of pigment (ppm) | Total transmittance (%) | YI | ΔYI | haze | Tensile modulus (GPa) | Pencil hardness |
| --- | --- | --- | --- | --- | --- | --- | --- | --- |
| Comparative Example 1 | — | 0 | 88.2 | 3.4 | 0.5 | 0.6 | 5.3 | H |

TABLE 2-continued

|  | Pigment | Amount of pigment (ppm) | Total transmittance (%) | YI | ΔYI | haze | Tensile modulus (GPa) | Pencil hardness |
|---|---|---|---|---|---|---|---|---|
| Example 1 | CuPc | 5 | 88.1 | 2.8 | 0.9 | 0.5 | 5.2 | H |
| Example 2 | CuPc | 10 | 87.8 | 2.4 | 0.9 | 0.7 | 4.9 | 2H |
| Example 3 | CuPc | 20 | 87.4 | 1.8 | 0.8 | 0.6 | 5.0 | H |
| Example 4 | CuPc | 30 | 87.0 | 0.7 | 0.7 | 0.6 | 5.2 | H |
| Example 5 | CuPc | 40 | 86.7 | 0 | 0.7 | 0.7 | 5.3 | H |
| Example 6 | Dioxazine violet | 5 | 88.2 | 2.7 | 0.7 | 0.9 | 5.2 | 2H |
| Example 7 | Dioxazine violet | 10 | 88.1 | 2.6 | 0.7 | 1.0 | 5.1 | H |
| Example 8 | Dioxazine violet | 20 | 87.6 | 2.2 | 0.8 | 1.1 | 5.0 | 2H |
| Example 9 | Dioxazine violet | 30 | 87.4 | 1.8 | 0.7 | 0.9 | 5.1 | H |
| Example 10 | Dioxazine violet | 90 | 85.7 | 0.1 | 0.7 | 0.9 | 5.2 | H |

Referring to the results of Table 2, the poly(imide-amide) copolymer films including greater than or equal to 5 ppm of the blue pigment and the violet pigment, according to the Examples, show almost no deterioration of mechanical properties such as tensile modulus and pencil hardness compared with the film including no pigment according to Comparative Example 1, but remarkably decreased yellow index (YI) in proportion to the amount of the pigments. In addition, the films maintain a yellow index difference of less than or equal to 1 after exposure to ultraviolet (UV) for 72 hours. Meanwhile, as an amount of the pigment added increases, total transmittance of a film may somewhat decrease, and the film may become blue. However, although the amount of the pigment increases, mechanical properties of the film hardly change.

Accordingly, a composition including a polyimide or poly(imide-amide) copolymer and the compound having a maximum absorption wavelength at about 570 nanometers or more in a visible radiation region according to an embodiment may reduce a yellow index without deteriorating mechanical properties of the copolymer film. This film may solve a technical problem of simultaneously improving mechanical properties and optical properties, and an article obtained therefrom may be successfully applied to a substrate or a window of a flexible display requiring high transparency and surface hardness.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An article comprising a polyimide or poly(imide-amide) copolymer, wherein the polyimide comprises a structural unit represented by Chemical Formula 1, and the poly(imide-amide) copolymer comprises a structural unit represented by Chemical Formula 1 and a structural unit represented by Chemical Formula 3, and
a compound having a maximum absorption wavelength at about 570 nanometers or more in a visible radiation region included in an amount of about 1 part per million to about 90 parts per million based on a total weight of the polyimide or the poly(imide-amide) copolymer,

Chemical Formula 1

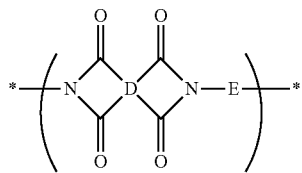

wherein, in Chemical Formula 1
D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)(C$_6$H$_5$)—, —C(CF$_3$)$_2$—, or —C(=O)NH—, and
E is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, C1 to C10 aliphatic hydrocarbon group, C6 to C20 aromatic hydrocarbon group, or C6 to C20 alicyclic hydrocarbon group), —C(CF$_3$)$_2$—, —C(CF$_3$)(C$_6$H$_5$)—, or —C(=O)NH—, and Chemical Formula 3

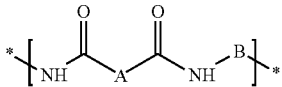

wherein, in Chemical Formula 3,

A and B are independently a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

2. The article of claim 1, wherein the compound having a maximum absorption wavelength at about 570 nanometers or more in a visible radiation region comprises at least one blue pigment selected from a metal phthalocyanine pigment, an indanthrone pigment, and an indophenol pigment, or at least one violet pigment selected from dioxazine violet, first violet B, methyl violet, and indanthrene brilliant violet.

3. The article claim 1, wherein D in Chemical Formula 1 is of formula Group 1:

Group 1

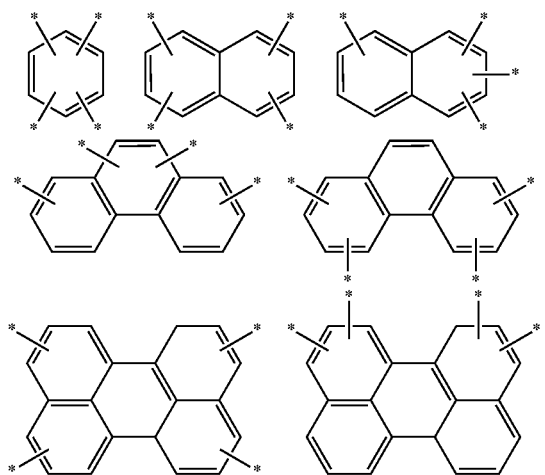

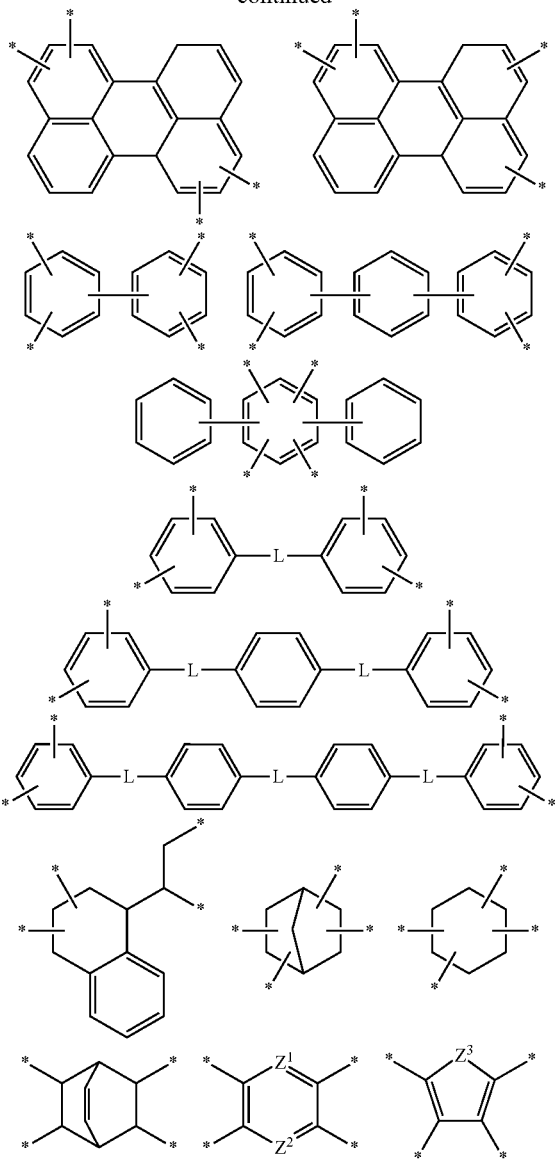

wherein, in the chemical formulae of Group 1,
each residual group is substituted or unsubstituted, and
each L is the same or different and is independently a single bond, —O—, —S—, —C(=O)—, —CH(OH)—, —S(=O)$_2$—Si(CH$_3$)$_2$—, —(CH$_2$)$_p$— (wherein, 1≤p≤10), (CF$_2$)$_q$ (wherein, 1≤q≤10), —CR'R"— (wherein, R' and R" are independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—,
* is a linking point to an adjacent atom,
Z$^1$ and Z$^2$ are the same or different and are independently —N= or —C(R$^{100}$)=, wherein R$^{100}$ is hydrogen or a C1 to C5 alkyl group, provided that Z$^1$ and Z$^2$ are not simultaneously —C(R$^{100}$)=, and
Z$^3$ is —O—, —S—, or —NR$^{101}$—, wherein R$^{101}$ is hydrogen or a C1 to C5 alkyl group.

4. The article of claim 1, wherein D in Chemical Formula 1 is a formula of Group 2:

Group 2
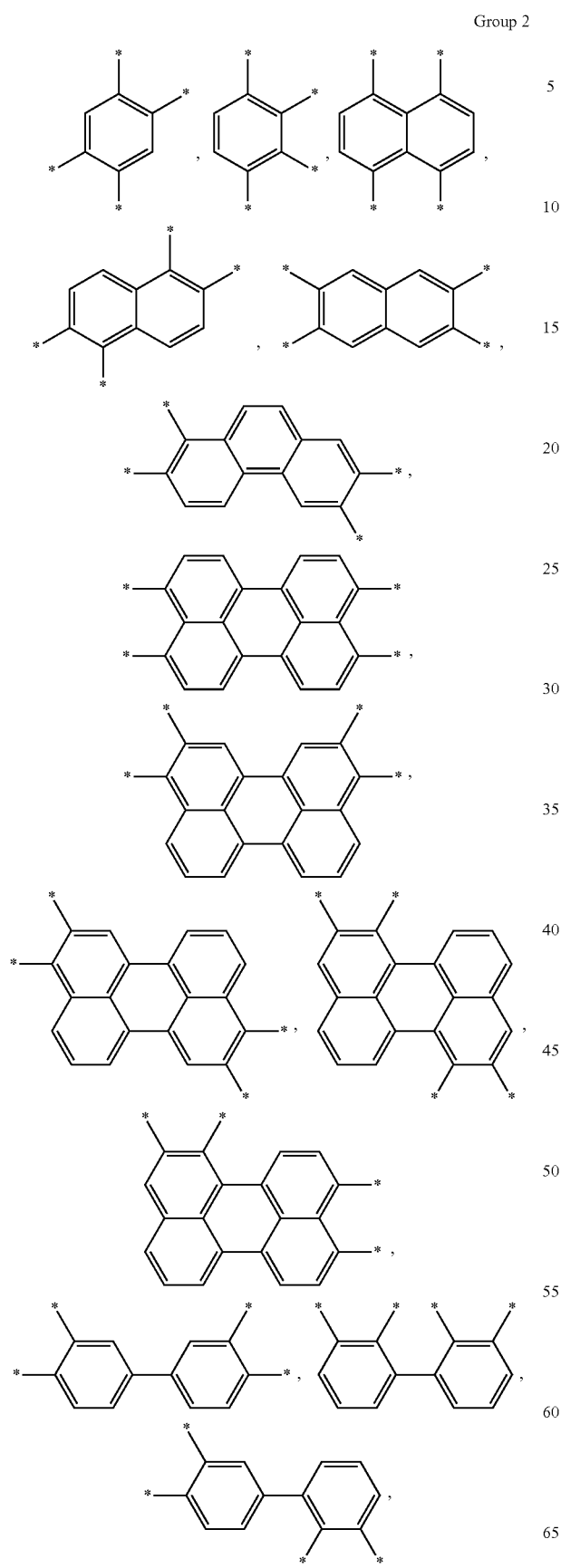
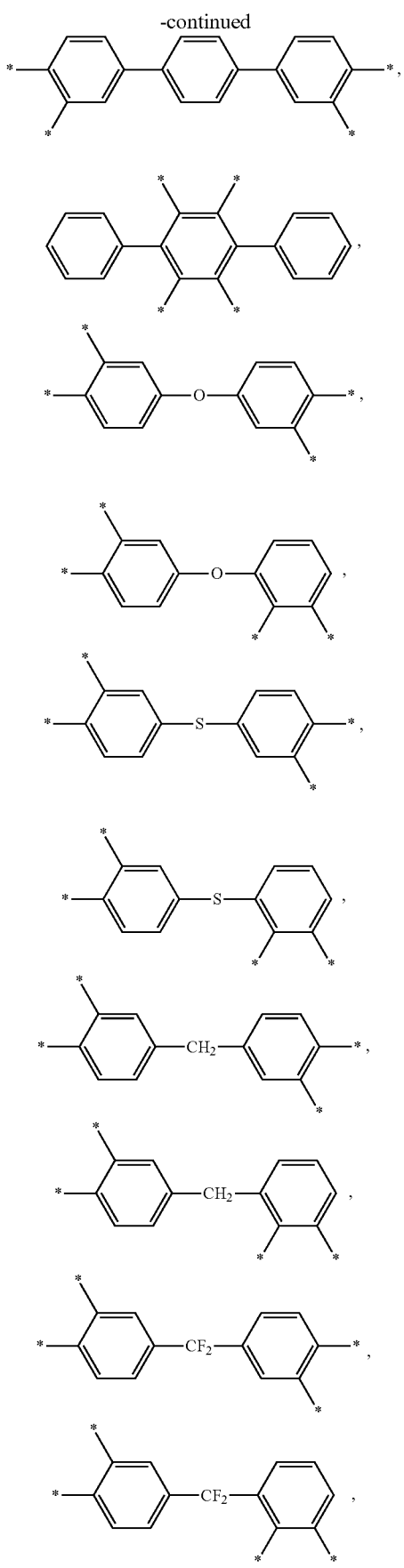

-continued
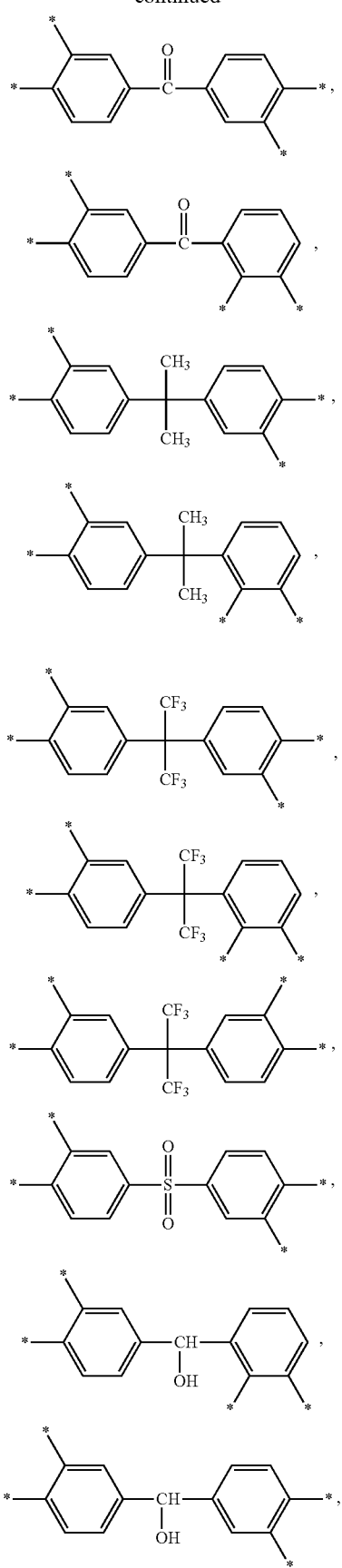
-continued
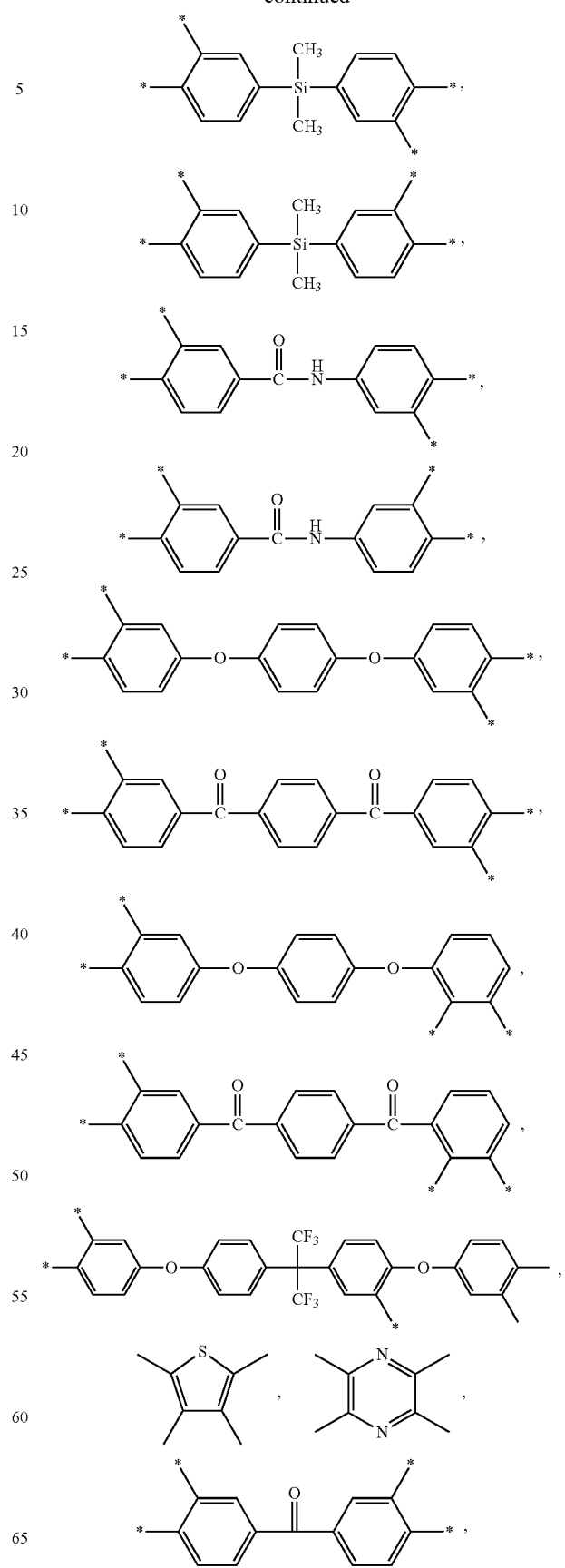

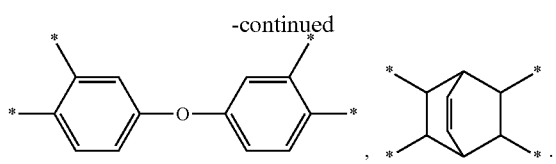

5. The article of claim 1, wherein E in Chemical Formula 1 is represented by Chemical Formula 5:

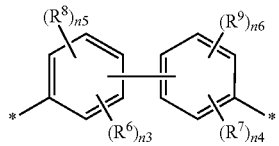

Chemical Formula 5 wherein, in Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, and n4 is an integer ranging from 1 to 4, n6 is an integer ranging from 0 to 3, provided that n4+n6 is an integer of 4 or less.

6. The article of claim 1, wherein A in Chemical Formula 3 is selected from chemical formulae of Group 3:

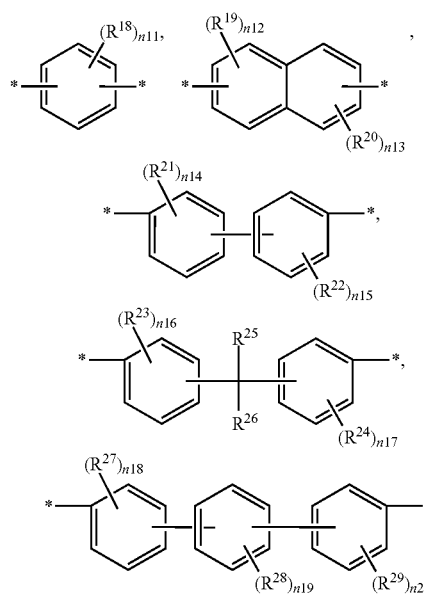

Group 3 wherein, in the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, and n12 and n13 are independently an integer ranging from 0 to 3.

7. The article of claim 1, wherein A in Chemical Formula 3 is selected from chemical formulae of Group 4:

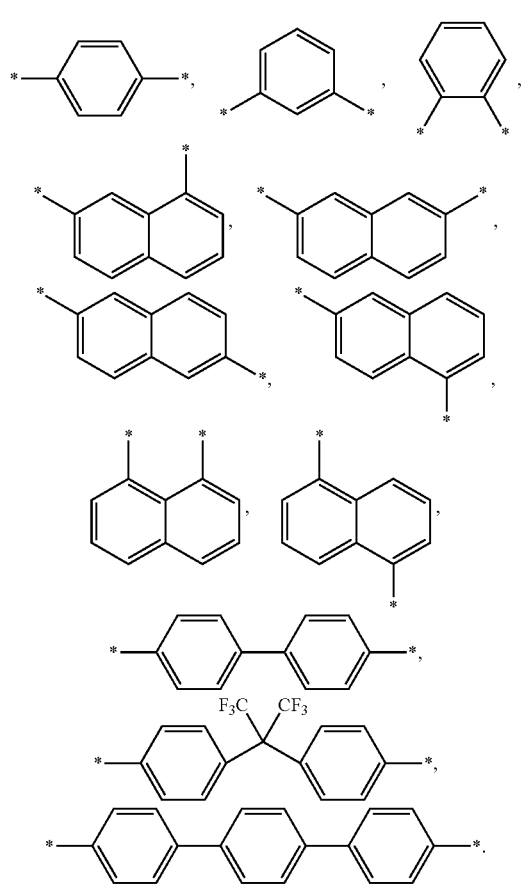

Group 4

8. The article of claim 1, wherein B in Chemical Formula 3 is represented by Chemical Formula 5:

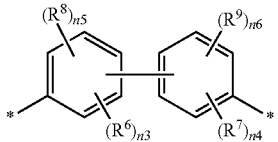

Chemical Formula 5 wherein, in Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group ($-SiR^{205}R^{206}R^{207}$ wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, and n4 is an integer ranging from 1 to 4, n6 is an integer ranging from 0 to 3, provided that n4+n6 is an integer of 4 or less.

9. The article of claim 1, wherein the structural unit represented by Chemical Formula 1 comprises at least one of a structural unit represented by Chemical Formula 9 and a structural unit represented by Chemical Formula 10:

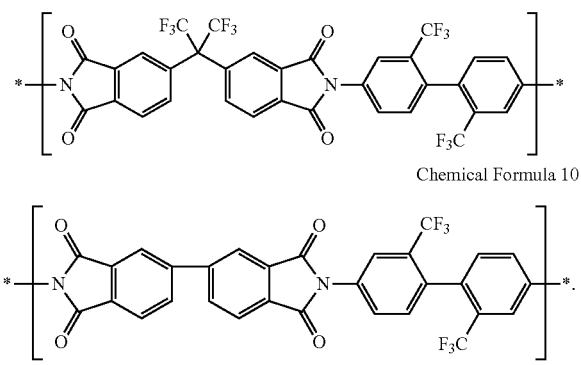

Chemical Formula 9

Chemical Formula 10

10. The article of claim 1, wherein the structural unit represented by Chemical Formula 3 comprises at least one of the structural units represented by Chemical Formula 6 to Chemical Formula 8:

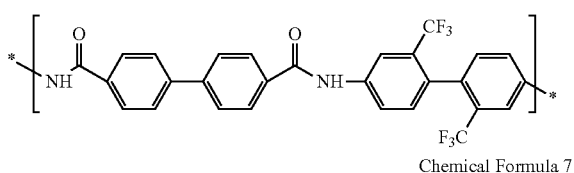

Chemical Formula 6

Chemical Formula 7

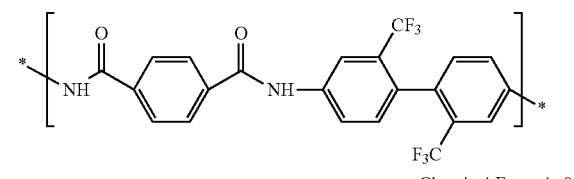

Chemical Formula 8

11. The article of claim 1, wherein the article further comprises an additional coating layer disposed on at least one surface of the transparent film.

12. A display device comprising the article of claim 1.

13. The article of claim 1, wherein the compound is included in the transparent film in an amount of 5 parts per million to about 80 part per million.

14. The article of claim 1, wherein the compound is included in the transparent film in an amount of 1 part per million to about 50 parts per million.

15. The article of claim 1, wherein the compound is included in the transparent film in an amount of 1 part per million to about 30 parts per million.

16. A composition for preparing an article comprising a poly(imide-amide) copolymer, the composition comprising:
a poly(imide-amide) copolymer comprising a structural unit represented by Chemical Formula 7, and at least one structural unit represented by Chemical Formula 9 or a structural unit represented by Chemical Formula 10, and
a compound having a maximum absorption wavelength at about 570 nanometers or more in a visible radiation region in an amount of about 1 part per million to about 90 parts per million based on a weight of the poly(imide-amide) copolymer:

Chemical Formula 7

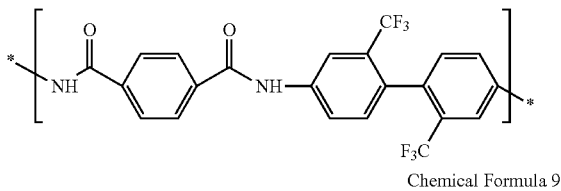

Chemical Formula 9

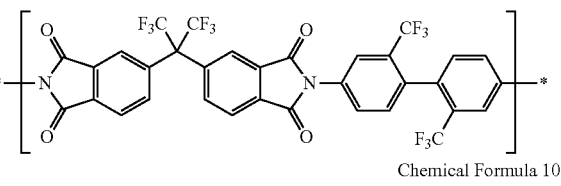

Chemical Formula 10

17. The composition of claim 16, wherein the compound having a maximum absorption wavelength at about 570 nanometers or more in a visible radiation region is copper phthalocyanine or dioxazine violet.

18. The composition of claim 16, wherein a mole ratio of the structural unit represented by Chemical Formula 7 and the at least one of the structural unit represented by Chemical Formula 9 or the structural unit represented by Chemical Formula 10 in the composition is about 20:80 to about 80:20.

19. The article of claim 1, wherein the article is a transparent film having a yellow index of less than or equal to about 3.0 at a thickness of about 80 micrometers according to an ASTM E313 method and a tensile modulus of greater than about 4.5 gigapascals according to an ASTM D882 method.

20. The article of claim 1, wherein the article is a transparent film having a total wavelength transmittance of greater than or equal to about 86% in a range of about 400 nanometers to about 750 nanometers, and wherein the transparent film has a region where transmittance decreases and then increases in a partial section of about 450 nanometers to about 700 nanometers.

* * * * *